US012114134B1

(12) United States Patent
Kuruba Buchannagari et al.

(10) Patent No.: US 12,114,134 B1
(45) Date of Patent: Oct. 8, 2024

(54) ENHANCEMENT EQUALIZER FOR HEARING LOSS

(71) Applicant: Amazon Technologies, Inc., Seattle, WA (US)

(72) Inventors: Shobha Devi Kuruba Buchannagari, Fremont, CA (US); Ludger Solbach, San Jose, CA (US); Madhuri Saraf, Sunnyvale, CA (US); Andrew Jackson Stockton, X, Boston, MA (US)

(73) Assignee: Amazon Technologies, Inc., Seattle, WA (US)

( * ) Notice: Subject to any disclaimer, the term of this patent is extended or adjusted under 35 U.S.C. 154(b) by 202 days.

(21) Appl. No.: 17/955,355

(22) Filed: Sep. 28, 2022

(51) Int. Cl.
*H04R 25/00* (2006.01)

(52) U.S. Cl.
CPC .................................. *H04R 25/505* (2013.01)

(58) Field of Classification Search
CPC ....... H04R 25/00; H04R 25/50; H04R 25/505
See application file for complete search history.

(56) References Cited

U.S. PATENT DOCUMENTS 11,074,903 B1 * 7/2021 Yen .................. G10K 11/17881
2021/0337301 A1 * 10/2021 Udesen .................... H04R 3/04

* cited by examiner

*Primary Examiner* — Tuan D Nguyen
(74) *Attorney, Agent, or Firm* — Pierce Atwood LLP

(57) ABSTRACT

An enhancement equalizer (EEQ) can be configured to compensate for hearing loss. An app or application can assist a user with measuring hearing loss at various frequencies (e.g., threshold sensitivity versus normal hearing). Using these measurements, the system may compute a set of filters for an EEQ that can boost different frequencies by different amounts corresponding to the user's sensitivity to that frequency. The measurement and resulting EEQ may be earphone specific (e.g., both the measurement and the filter computation may depend on the particular type/model of earphone used). In some implementations, the system may allow the user to select correction strength that controls an amount of correction applied (e.g., 25%, 50%, or 75% of full correction). In some implementations, the system may adjust the EEQ and/or correction strength according to the volume of playback (e.g., by applying less correction at higher playback volumes to avoid triggering earphone limiters).

20 Claims, 13 Drawing Sheets

ENHANCEMENT EQUALIZER FOR HEARING LOSS

BACKGROUND

Audio input/output devices, such as earbuds, headphones, headsets, and/or other devices having a microphone and loudspeaker may be used to output audio using the loudspeaker and/or capture audio using the microphone. The audio device may be configured to communicate via a wired and/or wireless connection with a user device, such as a smartphone, smartwatch, laptop, or similar device. The audio device may be used to output audio sent from the user device—the output audio may be, for example, music, voice, or other audio. The audio device may similarly be used to receive audio, which may include a representation of an utterance, and send corresponding audio data to the user device.

BRIEF DESCRIPTION OF DRAWINGS

For a more complete understanding of the present disclosure, reference is now made to the following description taken in conjunction with the accompanying drawings.

DETAILED DESCRIPTION

Figure 1:
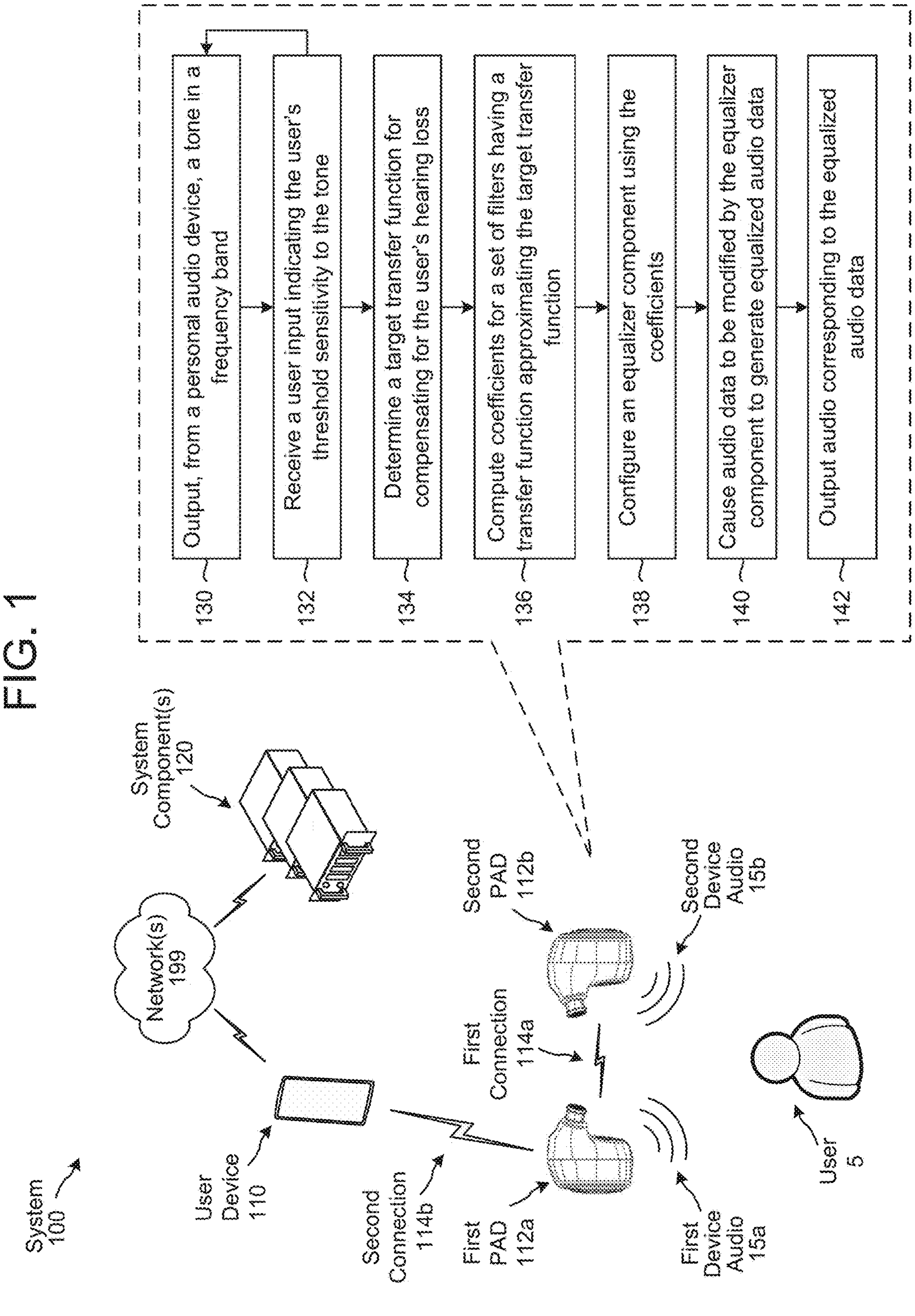
FIG. 1 illustrates a system implementing an enhancement equalizer (EEQ) in a personal audio output device, according to embodiments of the present disclosure.

Personal audio output devices may be carried and/or worn by a user to improve the listening experience and/or increase privacy associated with playback of audio data. Personal audio output devices may include earphones (e.g., which may include different types of headphones and earbuds), speakers (e.g., for outputting audio to a room or open area), bone-conduction headphones (e.g., for transmitting audio through bones in a user's skull instead of their ear canal), etc. Headphones may include over-ear and on-ear types, and may be open-back or closed-back. Earbuds may include in-ear types, which may form a seal within the ear canal that acts as an acoustic barrier, and "open" or "classic" earbuds, which may form only a partial seal or no seal with the ear canal, but rather may rest or hang from the outer ear anatomy. Speakers may include wireless and/or portable speakers for personal listening, as well as desk/floor/wall-mounted speakers, studio monitors, etc.).

Some individuals may suffer from hearing impairments such as hearing loss. The hearing loss may vary by frequency range of the particular audio. For example, an individual may have reduced sensitivity at frequencies associated with speech intelligibility (for example, between 1-4 kHz) while having normal or near normal hearing sensitivity at other frequencies. In some cases, the individual may retain some ability to hear frequencies for which their threshold sensitivity (e.g., the lowest sound pressure level they can detect at that frequency) may be low relative to average hearing. Thus, boosting the amplitude of those frequencies may aid intelligibility of verbal audio and/or improve the listening experience for all types of audio. Providing the user with a mechanism for selectively boosting frequency bands corresponding to the user's impairment may allow the user to hear the audio effectively at an overall volume that is lower than may be necessary without equalization (EQ). In addition, selective boosting of frequency boosting may be more efficient, improve battery longevity of wireless and/or battery-powered personal audio devices, and otherwise improve a user experience.

Different types of personal audio output devices may differ in how they reproduce the various frequency bands and deliver them to the user's ear. For example, closed-back headphones and in-ear earbuds may be more effective at delivering lower frequency bands (e.g., bass). Different types and/or models of personal audio devices may use different numbers and types of drivers (e.g., loudspeakers). Fit of a particular device to a user's head/ears may further affect the reproduction and/or transmission of audio to the eardrum. Thus, appropriate EQ settings may be determined for a particular user using a particular personal audio output device. Furthermore, in many cases, personal audio output devices may be constrained in battery and/or processing power. Therefore, the EQ may be implemented by computing a set of relatively low-cost, in terms of millions of instructions per second (MIPS) or other computing resources required, digital filters for boosting the desired frequency bands by the desired amount.

Offered herein are systems and methods for computing and implementing an enhancement equalizer (EEQ) for compensating for frequency-specific hearing loss. A software application (app) operating on a companion device can assist a user to self-administer a hearing test using a personal audio output device. The hearing test may attempt to determine the user's threshold sensitivity to pure tones at different frequencies when using the personal audio output device. Hearing sensitivity may be measured in hearing loss decibels (dB HL), which express how much louder a tone is before the user to hear it relative to an individual with normal hearing. For example, the hearing test may determine that the user's threshold sensitivity is normal (e.g., 0 dB HL) at 500 Hz, 30 dB HL at 1 kHz, and 60 dB HL at 1 kHz. Using the measured threshold sensitivities, the app may determine an audiogram that expresses the hearing loss as a relationship between frequency bands and the dB HL measured for each. Such testing may be performed, and data/audiogram be determined, for individual ears of a user. Such testing may also be performed, and data/audiogram be determined, for different personal audio output device(s) for a particular user. Thus a system may determine a variety of data representing user hearing sensitivity for different ears, using different devices, across different frequency range(s), etc. Such testing may also be determined under different acoustic conditions, or to account for other variables that may impact a listening experience. The EEQ may be applied to audio data being played back from various sources, such as music, a podcast, video, electronic game, telephone conversation, voice mail, ambient audio, etc.

The system may use the audiogram to create an EQ profile to compensate for the user's hearing loss by boosting frequency bands in an amount that correlates with the hearing loss measured for that frequency band. The EQ may include a set of digital filters that may be implemented by, for example, a digital signal processor (DSP) or similar processor in the personal audio output device and/or playback device (e.g., another user device such as a mobile phone, smart watch, etc.). The digital filters may be specified by a set of coefficients. The system may compute the set of coefficients iteratively to determine a set of filters that can create an EQ profile that corresponds to the audiogram; that is, the EQ may boost the audio signal in frequency bands by an amount that corresponds to the hearing loss measured in that band. Due to interaction between the filters, computing the coefficients of the filters may be performed iteratively to reduce an error between the EQ profile and the audiogram. Once the filter coefficients have been determined, the system may deploy the enhancement equalizer to the personal audio output device or associated device.

In some cases, a user may not wish the audio output to be fully corrected. The user may have adapted to reduced sensitivities to frequencies and find fully corrected audio to be distorted. Thus, in some implementations, the system may allow the user to select a correction strength; for example, to boost frequency bands by only 25, 50, or 75% of the amount determined by the hearing test. For example, if the user exhibits 40 dB of hearing loss within a frequency band, selecting a correction strength of 75% may result in the enhancement equalizer boosting that frequency band by only 30 dB, which may be sufficient for the particular user.

A correction strength of less than 100% may correspond to a different EQ profile than a fully correcting EQ. This is because the gains at each frequency band will be different. Thus, a set of filters corresponding to a fully correcting EQ may have different coefficients than a set of filters corresponding to a partially correcting EQ. Computing and/or storing multiple sets of filter coefficients corresponding to the different correction strengths may require additional resources. To further conserve battery, memory, and/or processor resources, the correction strength selection may be implemented by mixing the unequalized (e.g., pre-EQ) signal with the equalized signal in the ratio chosen. Thus, to provide a correction strength of 50%, the system may mix the dry signal and equalized signal. To provide a correction strength of greater than or less than 50%, the system may raise or lower the amplitude of one signal versus the other when mixing the two.

In some cases, a user may desire less correction at higher overall volumes. For example, if the user is listening to audio at a high volume, less correction may be needed to raise certain frequency bands to above a threshold sensitivity. Furthermore, the personal audio output device may include protection circuitry such a compressor, limiter, and/or other circuitry or logic that prevents the overall output volume from exceeding certain limits. When the output volume is high, the boosted frequency bands may be more likely to trigger the protection circuitry. Thus, in some implementations, the correction strength may depend on volume. For example, at low overall output volumes the correction strength may be 75%, at moderate volumes the correction strength may be 50%, and at high volumes the correction strength may be 25%.

These and other features of the disclosure are provided as examples, and maybe used in combination with each other and/or with additional features described herein. The systems and methods may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. For example, the measurements and user selections described herein may constitute medical data and thus may be subject to laws governing the use of such information. The system and techniques can be implemented on a geographic basis to ensure compliance with laws in various jurisdictions and entities in which the components of the system and/or user are located.

FIG. 1 illustrates a system 100 implementing an enhancement equalizer (EEQ) in a personal audio output device, according to embodiments of the present disclosure. The system 100 may include a personal audio device (PAD) 112 for outputting audio to a user 5. The audio may be, for example but not limited to, music, a podcast, video, electronic game, telephone conversation, voice mail, ambient audio (such that the device implementing the EEQ may act as a hearing aid), etc. In some cases, the PAD 112 may have a first PAD 112*a* for outputting first device audio 15*a* to a right ear of the user 5, and a second PAD 112*b* for outputting second device audio 15*b* to a left ear of the user 5. The PADs 112*a* and 112*b* may communicate via a first wired and/or wireless connection 114*a*. The PAD 112 may receive audio data over a second wired and/or wireless connection 114*b* from a user device 110 and/or other system component 120. In some implementations, the PAD 112 may include a microphone for receiving audio (e.g., from the user 5), and the PAD 112 may send audio data back to the user device 110 and/or the system component(s) 120 via the second connection 114*b*. Additional details of components and use of the PAD 112 are described below with reference to FIGS. 2 and 3. The user device 110 and system component(s) 120 may communicate via one or more computer networks 199. Components of the PAD 112 and user device 110 are described in additional detail below with reference to FIG. 10. In various implementations, the user device 110 may be one of the devices 110*a* through 110*g* shown in FIG. 11, or other type of device. The systems component(s) 120 are described below with reference to FIG. 12.

The system 100 may implement media playback equalization to compensate for hearing loss of the user 5 using example operations 130 through 142 as shown in FIG. 1. In some implementations, the operations may be performed with the aid of one or more applications executing on the user device 110 and/or other system component(s) 120. The system 100 may administer a hearing test of the user 5, and use the measurements to generate an enhancement equalizer that may partially and/or fully adjust output audio to compensate for the measured hearing loss. The measurements and/or the resulting enhancement equalizer settings may be specific to a particular type and/or model of PAD 112 due to, for example, different capabilities of different PADs 112 to deliver audio within various frequency bands to the user and/or variations of electrical, mechanical, and/or acoustic properties of each PAD 112.

The system 100 may cause the PAD 112 to output (130) a tone in a frequency band. The tone may be a pure tone at or near a center frequency of the frequency band, for example, 63, 125, 250, 500 Hz, etc. The system 100 may provide the user 5 with a user interface (e.g., on the user device 110) to indicate whether/when the user 5 can hear the tone. The system 100 may receive (132) a user 5 input indicating the user's threshold sensitivity to the tone. The outputting (130) and the receiving (132) may be repeated for tones of various frequencies. In some implementations, the frequency bands will have octave spacing where each frequency band centers around a frequency double that of the next lower band (e.g., continuing the example above, the tone frequencies may be 63, 125, 250, 500, 1,000, 2,000, 4,000, 8,000, and 16,000 Hz).

The system 100 may compare the measured threshold sensitivities with reference sensitivities representing threshold sensitivities for individuals with normal hearing. For example, the hearing test may measure and/or estimate the lowest sound pressure level (SPL) at which the user 5 can hear the tone. An SPL measurement can be measured in decibels (dB), which express a ratio of the measured SPL to a reference value (typically level corresponding to threshold audibility for normal hearing) on a logarithmic scale. The lowest SPL at which the user can hear the tone can be expressed in dB HL, where "HL" stands for hearing loss. A dB HL below 15 may indicate normal hearing sensitivity at that frequency, a dB HL between 40 and 55 may indicate moderate hearing loss, and dB HL above 70 dB HL may indicate severe hearing loss.

Figure 6:
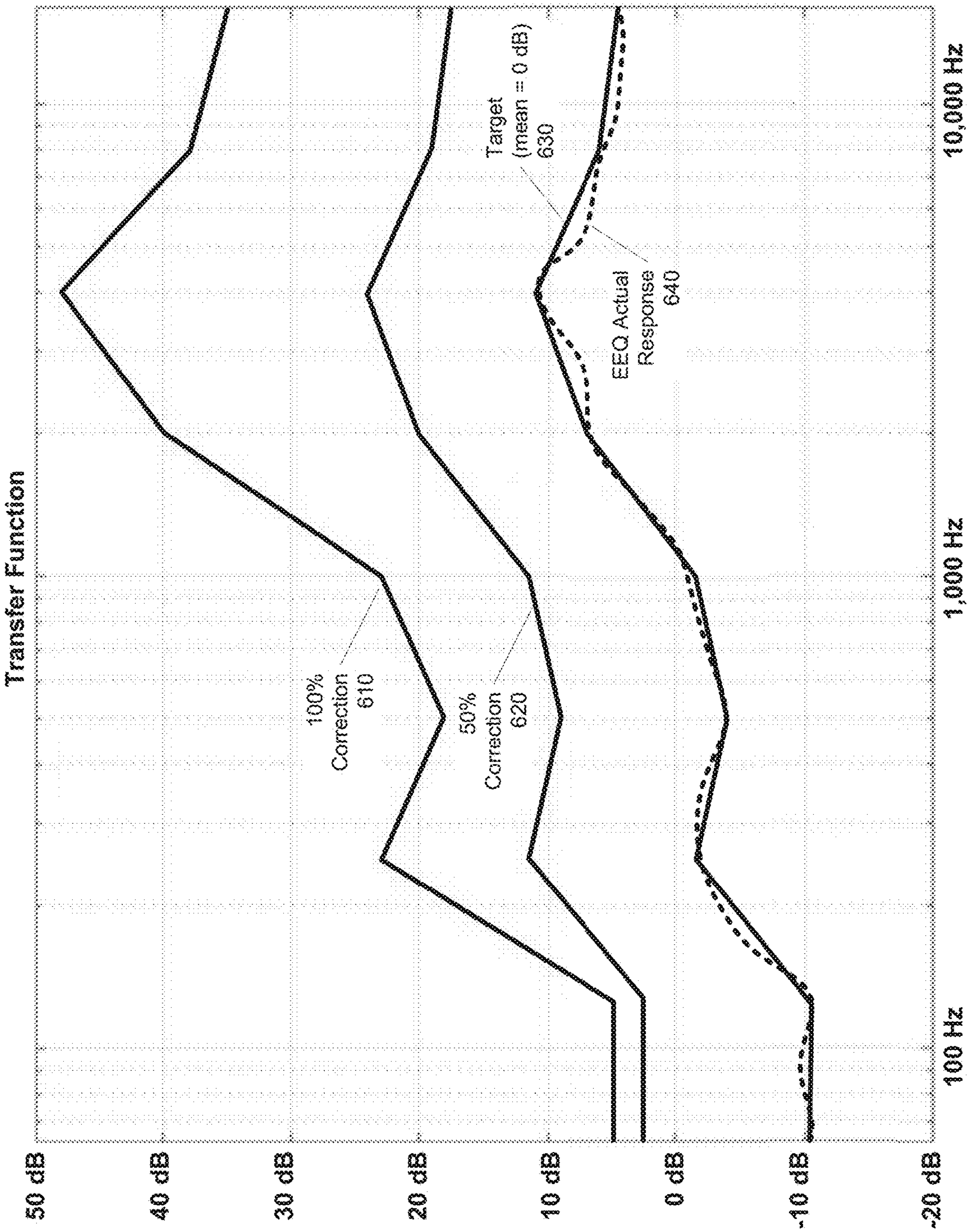
FIG. 6 is a graph representing example target transfer functions of EEQs at various levels of correction strength, and an example actual response of an EEQ, according to embodiments of the present disclosure.

Using the measurements, the system 100 may determine (134) a target transfer function for compensating for the user's hearing loss. The transfer function may indicate an amount of gain to apply within each frequency band to bring audio within that band from normal threshold audibility to threshold audibility for the user 5. The transfer function may be expressed as set of frequency-gain pairs, and illustrated as an audiogram as shown in FIG. 6.

In some cases, a user 5 with mild to moderate hearing loss may not wish to have audio fully corrected. That is, if the user has a dB HL of 40, a gain of 40 dB SPL applied to audio in that frequency band may cause the output volume to exceed a limit and triggering an output limiter of the PAD 112. In addition, the user 5 may perceive the output volume as uncomfortably loud and/or unnaturally loud. This is because perception of loudness is non-linear. Rather, while an individual with a hearing impairment may not hear a quiet sound, they may perceive a loud sound with the same sensitivity as an individual with normal hearing. In other words, a sound above the hearing sensitivity of the hearing impaired individual will sound just as loud to both the hearing impaired individual and the individual with normal hearing sensitivity.

Therefore, the target transfer function may not represent a "full" compensation for the user's measured hearing loss. Rather, the target transfer function may represent a partial compensation for the user's hearing loss.

In some implementations, the system 100 may include a user-selectable correction strength that further adjusts the transfer function of the enhancement equalizer. For example, the user 5 may select 25%, 50%, 75% correction, etc. In an example operation, a correction strength of 50% may adjust the target transfer function from +40 dB at 500 Hz and +50 at 1,000 Hz to +20 dB and +25 dB, respectively. In some implementations, the system 100 may automatically adjust the correction strength depending on an output volume setting. For example, at low output volumes where certain frequency bands may be inaudible, the correction strength may be increased; while at higher output volumes where many or most frequency bands are audible, the correction strength may be lowered (e.g., to avoid certain frequency bands sounding unnaturally or uncomfortably loud and/or to avoid triggering output limiters of the PAD 112). The correction strength and volume-dependent correction strength a described in further detail below with reference to FIGS. 8 and 9.

Once the target transfer function has been determined, the system 100 may compute (136) a set of coefficients for a set of digital filters having a transfer function approximating the target transfer function. A digital filter may correspond to a frequency band (e.g., a frequency band centered at 63 Hz, 125 Hz, or 250 Hz, etc.). The computation may be an iterative process in which the system 100 calculates a Q-factor, gain, and coefficients for each digital filter, and iteratively adjusts the gains until a transfer function of the combined filters approximates the target transfer function. The system 100 may iterate the computation until an error between the filters' transfer function and the target transfer function falls below a threshold and/or until a given number of iterations have completed. In some implementations, the system 100 may perform 20 iterations of the computation. In various implementations, the system 100 may perform between 10 and 30 iterations of the computation. In various implementations, the system 100 may perform more or fewer iterations of the computation.

The Q-factor may describe a ratio of a center frequency of the filter to the filter's bandwidth. The system 100 may calculate the Q-factor based on a slope of the target transfer function between the center frequency of the frequency band corresponding to the filter, and the center frequencies of the adjacent frequency bands. The gain may describe an amount of boost/cut to apply at a frequency band. In some implementations, the target transfer function is normalized such that the average gain is 0 dB, with frequencies for which the hearing impairment is greater having a positive gain (representing volume boost relative to other frequencies) and frequencies for which the hearing impairment is lower having a negative gain (representing a volume reduction relative to other frequencies). The filter coefficients may represent the coefficients of the filter transfer function. For example, in some implementations, the filters may digital biquadratic, or "biquad," filters, which are second order recursive linear filters having two poles and two filters. A biquad filter has a transfer function that, in the Z domain, is a ratio of two quadratic functions as follows:

$$H(z) = \frac{b_0 + b_1 z^{-1} + b_2 z^{-2}}{a_0 + a_1 z^{-1} + a_2 z^{-2}}$$

or, if $a_0$ is normalized to 1:

$$H(z) = \frac{b_0 + b_1 z^{-1} + b_2 z^{-2}}{1 + a_1 z^{-1} + a_2 z^{-2}}$$

Once the filter coefficients have been computed, the system 100 may generate (138) the enhancement equalizer. The enhancement equalizer may be embodied, for example, as code to be executed by a digital signal processor or other processor. The system 100 may deploy the enhancement equalizer to cause (140) audio to be modified by the enhancement equalizer prior to output by the PAD 112. The system 100 may output (142) audio corresponding to the resulting equalized audio data. In some implementations, the functions of the enhancement equalizer may be performed by one or more processors in the PAD 112. Measurement of hearing loss and computation of filter coefficients are described in additional detail below with reference to FIGS. 4 through 6. Implementation of the enhancement equalizer during playback is described in further detail below with reference to FIG. 7.

The PAD 112, user device 110, and/or system component 120 may include a user profile storage that may store data about the user. The stored data may include measurements from the hearing test; coefficients calculated for the user-/device-specific EEQ; a device identifier or device type identifier; and/or user settings related to correction strength, volume-dependent EEQ, and/or supplemental EQ (e.g., manual EQ settings). The user data may be stored such that if the user purchases a new user device 110 and/or PAD 112, the new device may import or otherwise receive the user settings and implement the EEQ calibrated for that user. The user may have the option of using EEQ settings determined using a different PAD 112, even if the previous PAD 112 was a different type/model, as a default until the user performs a new hearing assessment.

Figure 2:
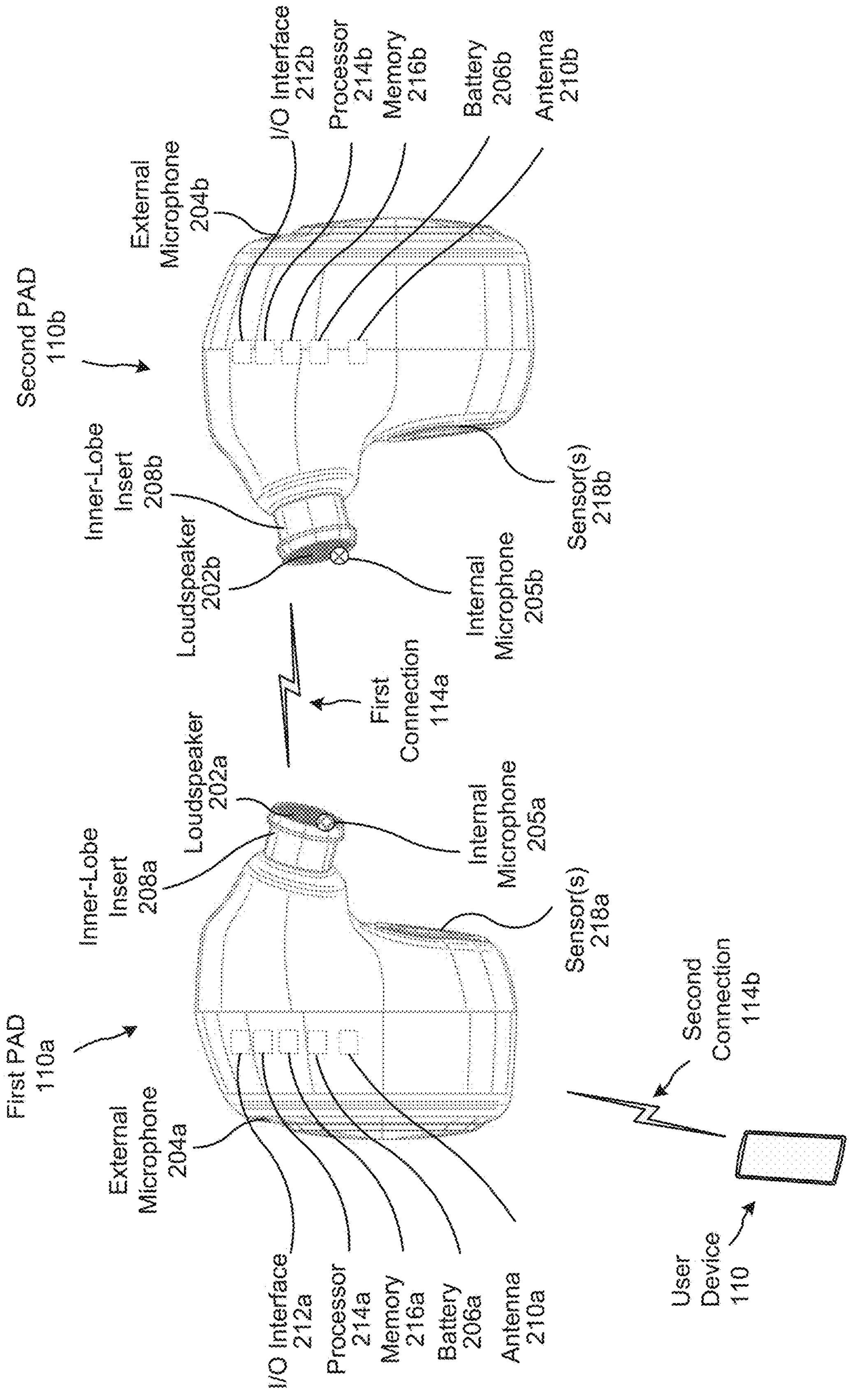
FIG. 2 is a diagram of components of an example personal audio output device (PAD), according to embodiments of the present disclosure.

FIG. 2 is a diagram of components of an example PAD 112, according to embodiments of the present disclosure. The first PAD 112*a* may be in communication with the second PAD 112*b* over the first connection 114*a*, and one or both PADs 112*a* and 112*b* may be in communication with the user device 110 over the second connection 114*b*. The present disclosure may, with respect to various connections 114*a* and 114*b*, and/or networks 199, refer to particular Bluetooth protocols, such as classic Bluetooth, Bluetooth Low Energy ("BLE" or "LE"), Bluetooth Basic Rate ("BR"), Bluetooth Enhanced Data Rate ("EDR"), synchronous connection-oriented ("SCO"), and/or enhanced SCO ("eSCO"), but the present disclosure is not limited to any particular Bluetooth or other protocol. In some embodiments, however, a first wireless connection 114*a* between the first PAD 112*a* and the second PAD 112*b* is a low-power connection such as BLE or NFMI; the second wireless connection 114*b* may include a high-bandwidth connection such as EDR in addition to or instead of a BLE connection. The user device 110 may communicate with one or more system component(s) 120, which may be server devices, via a network 199, which may be the Internet, a wide-area network ("WAN") or local-area network ("LAN"), or any other network.

In some implementations, the PAD 112 may include one or more microphones for capturing input audio and hardware and/or software for converting the input audio into audio data. The PAD 112 may include an audio output device, such as a loudspeaker or loudspeakers. Examples of PADs 112 include earbuds, headphones, and/or cellular phones. Various types of PADs may include a single device or physically connected and/or integrated devices such as headphones, which may be referred to as a PAD 112. Other types of PADs may include separate devices for each ear, such as earbuds, which may be referred to as a first PAD 112*a* (e.g., for the right ear) and a second PAD 112*b* (e.g., for the left ear). The user 5 may interact with the PAD 112 partially or exclusively using his or her voice and ears. Exemplary interactions include listening to music, video, or other audio, communications such as telephone calls, audio messaging, and video messaging, and/or audio input for search queries, weather forecast requests, navigation requests, or other such interactions.

In the present disclosure, PADs 112 capable of communication with both a user device 110 and each other may be referred to as "earbuds," but the term "earbud" does not limit the present disclosure to any particular type of wired or wireless headphones and/or other audio device, such as a cellular phone, portable speakers, etc. The present disclosure may further differentiate between a "right earbud" (e.g., a first PAD 112*a*), meaning a headphone component disposed in or near a right ear of a user, and a "left earbud" (e.g., a second PAD 112*b*) meaning a headphone component disposed in or near a left ear of a user. A "primary" earbud may communicate with both a "secondary" earbud, using a first wired or wireless connection (such as a cable, Bluetooth, or NFMI connection); the primary earbud may further communicate with a third device (such as a smartphone, smart watch, tablet, computer, server, or similar device) using a second wired or wireless connection (such as a cable, Bluetooth, or Wi-Fi connection). The secondary earbud may communicate directly with only with the primary earbud and may not communicate, using its own dedicated connection, directly with the third device; communication therewith may pass through the primary earbud via the first wired or wireless connection.

As shown, the first PAD 112*a* and second PAD 112*b* have similar features; in other embodiments, as noted above, the second PAD 112*b* (e.g., a secondary device) may have additional features with respect to the first PAD 112*a* or only a subset of the features of the first PAD 112*a*. As illustrated, the first PAD 112*a* and second PAD 112*b* are depicted as wireless earbuds having an inner-lobe insert; as mentioned above, however, the present disclosure is not limited to only wireless earbuds, and any wearable audio input/output system, such as a headset, over-the-ear headphones, or other such systems, is within the scope of the present disclosure.

The primary and secondary earbuds may include similar hardware and software; in other instances, the secondary earbud includes different hardware/software included in the primary earbud. If the primary and secondary earbuds include similar hardware and software, they may trade the roles of primary and secondary prior to or during operation. In the present disclosure, the primary earbud may be referred to as the first PAD 112*a* the secondary earbud may be referred to as the second PAD 112*b*, and the smartphone or other device may be referred to as the user device 110. The devices 112*a*, 112*b*, and/or 110 may communicate over one or more computer networks 199, such as the Internet, with one or more system components 120.

The PADs 112*a*/112*b* may each include a loudspeaker 202*a* and 202*b*. The loudspeaker 202*a* and 202*b* may be any type of loudspeaker, such as an electrodynamic loudspeaker, electrostatic loudspeaker, dynamic loudspeaker, diaphragm loudspeaker, or piezoelectric loudspeaker. The loudspeaker 202*a* and 202*b* may include a single audio-output device or a plurality of audio-output devices. As the term is used herein, a loudspeaker refers to any audio-output device; in a system of multiple audio-output devices, however, the system as a whole may be referred to as a loudspeaker while the plurality of audio-output devices therein may each be referred to as a "driver." The loudspeaker 202*a* and 202*b* may include one or more drivers, such as balanced-armature drivers, dynamic driver, or any other type of driver; however, the present disclosure is not limited to any particular type of loudspeaker 202*a* and 202*b* or driver.

A balanced-armature driver may include a coil of electric wire wrapped around an armature; the coil may be disposed between two magnets, and changes in the current in the coil may cause attraction and/or repulsion between it and the magnets, thereby creating sound using variations in the current. A balanced-armature driver may be referred to as "balanced" because there may be no net force on the armature when it is centered in the magnetic field generated by the magnets and when the current is not being varied.

A dynamic driver may include a diaphragm attached to a voice coil. When a current is applied to the voice coil, the voice coil moves between two magnets, thereby causing the diaphragm to move and produce sound. Dynamic drivers may thus be also known as "moving-coil drivers." Dynamic drivers may have a greater frequency range of output sound when compared to balanced-armature drivers but may be larger and/or more costly.

The devices 112*a*/112*b* may further each include one or more microphones, such as external microphones 204*a* and 204*b* and/or internal microphones 205*a* and 205*b*. The microphones 204*a* and 204*b* and 205*a* and 205*b* may be any type of microphone, such as a piezoelectric or microelectromechanical system ("MEMS") microphone. The loudspeakers 202*a* and 202*b* and microphones 204*a* and 204*b* and 205*a* and 205*b* may be mounted on, disposed on, or otherwise connected to the body of the devices 112*a*/112*b*. The devices 112*a*/112*b* may each further include inner-lobe inserts 208*a* and 208*b* that may position the loudspeakers 202*a* and 202*b* closer to the eardrum of the user and/or block ambient noise by forming an acoustic barrier with the ear canal of a user. The inner-lobe inserts 208*a* and 208*b* may be made of or include a soft, spongy, or foam-like material that may be compressed before insertion into an ear of a user and that may expand once placed in the ear, thereby creating a seal between the inner-lobe inserts 208*a* and 208*b* and the ear. The inner-lobe inserts 208*a* and 208*b* may further include a passageway that permits air to pass from the inner-lobe insert 208*a* and 208*b* to an external surface of the devices 112*a*/112*b*. This passageway may permit air to travel from the ear canal of the user to the external surface during insertion of the devices 112*a*/112*b*.

The internal microphones 205*a* and 205*b* may be disposed in or on the inner-lobe inserts 208*a* 208*b* or in or on the loudspeakers 202*a* and 202*b*. The external microphones 204*a* and 204*b* may be disposed on an external surface of the devices 112*a*/112*b* (i.e., a surface of the devices 112*a*/112*b* other than that of the inner-lobe inserts 208*a* and 208*b*).

One or more batteries 206*a* and 206*b* may be used to provide power to the devices 112*a* and 112*b*. One or more antennas 210*a* and 210*b* may be used to transmit and/or receive wireless signals over the first connection 114*a* and/or second connection 114*b*; an I/O interface 212*a* and 212*b* contains software and hardware to control the antennas 210*a* and 210*b* and transmit signals to and from other components. A processor 214*a* and 214*b* may be used to execute instructions in a memory 216*a* and 216*b*; the memory 216*a* and 216*b* may include volatile memory (e.g., random-access memory) and/or non-volatile memory or storage (e.g., flash memory). One or more sensors 218*a* and 218*b*, such as accelerometers, gyroscopes, or any other such sensor may be used to sense physical properties related to the PADs 112*a*/112*b*, such as orientation; this orientation may be used to determine whether either or both of the devices 112*a*/112*b* are currently disposed in an ear of the user (i.e., the "in-ear" status of each device) or not disposed in the ear of the user (i.e., the "out-of-ear" status of each device).

The first PAD 112*a* may correspond to a first channel (e.g., for a right ear) and the second PAD 112*b* may correspond to a second channel (e.g., for a left ear). One or more processors 214*a* of the first PAD 112*a* may perform processing corresponding to the first channel, and one or more processors 214*b* of the second PAD 112*b* may perform processing corresponding to the second channel. The processing may include equalization (including volume-dependent equalization), limiting (e.g., automatically reducing output volume to prevent exceeding an output volume limit), and/or other processes. In various implementations, the processing may additionally include automatic-echo cancellation, acoustic echo cancelation (AEC), and/or adaptive-noise cancellation (ANC).

Automatic-echo cancellation may employ an adaptive filter adapted, using an algorithm such as a least-mean-squares ("LMS") algorithm, to minimize an error signal that corresponds to a difference between microphone data (e.g., received at the internal microphones 205) and playback data (e.g., output by the loudspeakers 202). The result may be a transfer function H(z) that processes audio data to remove the playback data. This same transfer function H(z) may then also be used by the equalizer to compensate for the effects of the barrier and/or effects caused by ANC.

AEC may refer to systems and methods for removing audio output by a loudspeaker from a signal captured by a microphone (e.g., one of the external microphones 204*a* and/or 204*b*). For example, if a first user is speaking to a second user via two devices over a network, the loudspeaker of the first user outputs the voice of the second user, and the microphone of the first user captures that voice. Without AEC, that voice would be send back to the device of the second user for re-output or ("echo"). Audio corresponding to the voice of the second user is thus subtracted from the data from the microphone. Before this subtraction, however, the voice of the second user may be delayed to account for the time-of-flight of the sound. The voice of the second user may also be modified in accordance with an estimation of the channel between the loudspeaker and microphone. As the term is used herein, "channel" refers to everything in the path between the loudspeaker (and associated circuitry) and the microphone (and associated circuitry), and may include a digital-to-analog converter (DAC) for transforming digital audio data into analog audio data, an amplifier and/or speaker driver for amplifying the analog audio data and for causing the loudspeaker to output audio corresponding to the amplified audio data, the physical space between the loudspeaker and the microphone (which may modify the audio sent therebetween based on the physical properties of the physical space, and/or an analog-to-digital converter for converting analog audio data received by the microphone into digital audio data.

ANC may also be referred to as active-noise control, and may refer to systems and methods for reducing unwanted ambient external sound or "noise" by producing a waveform, referred to herein as "anti-noise," having an opposite or negative amplitude—but similar absolute value—compared to the noise. For example, if a noise signal corresponds to sin Θ, the anti-noise signal corresponds to −sin Θ. The anti-noise is output such that it collides with the noise at a point of interest, such as a point at or near where an ear of a user is disposed, and cancels out some or all of the noise. The anti-noise may instead or in addition be combined with audio output or playback, such as audio output corresponding to music or voice, such that when the audio output collides with the noise, the noise is cancelled from the audio output.

Feedforward ANC ("FF-ANC") refers to a type of ANC in which a microphone of the device is positioned such that it receives audio from environmental sounds but not audio output by a microphone (e.g., an "external" microphone). This received audio may be delayed and inverted before being output by the loudspeaker (in addition to playback audio).

Feedback ANC ("FB-ANC) refers to a type of ANC in which a microphone of the device is positioned such that it receives both audio from environmental sounds and the audio output by a microphone (e.g., an "internal" microphone). Because this internal microphone captures the audio output, it processes the microphone data to remove the corresponding audio. For example, the FB-ANC may adapt an adaptable filter to remove noise audio only when the loudspeaker is not outputting its own audio. The FB-ANC may similarly process the microphone data to removing sounds having little variation (e.g., the drone of a ceiling fan) but not remove sounds having higher variation (e.g., voice and music).

Figure 3:
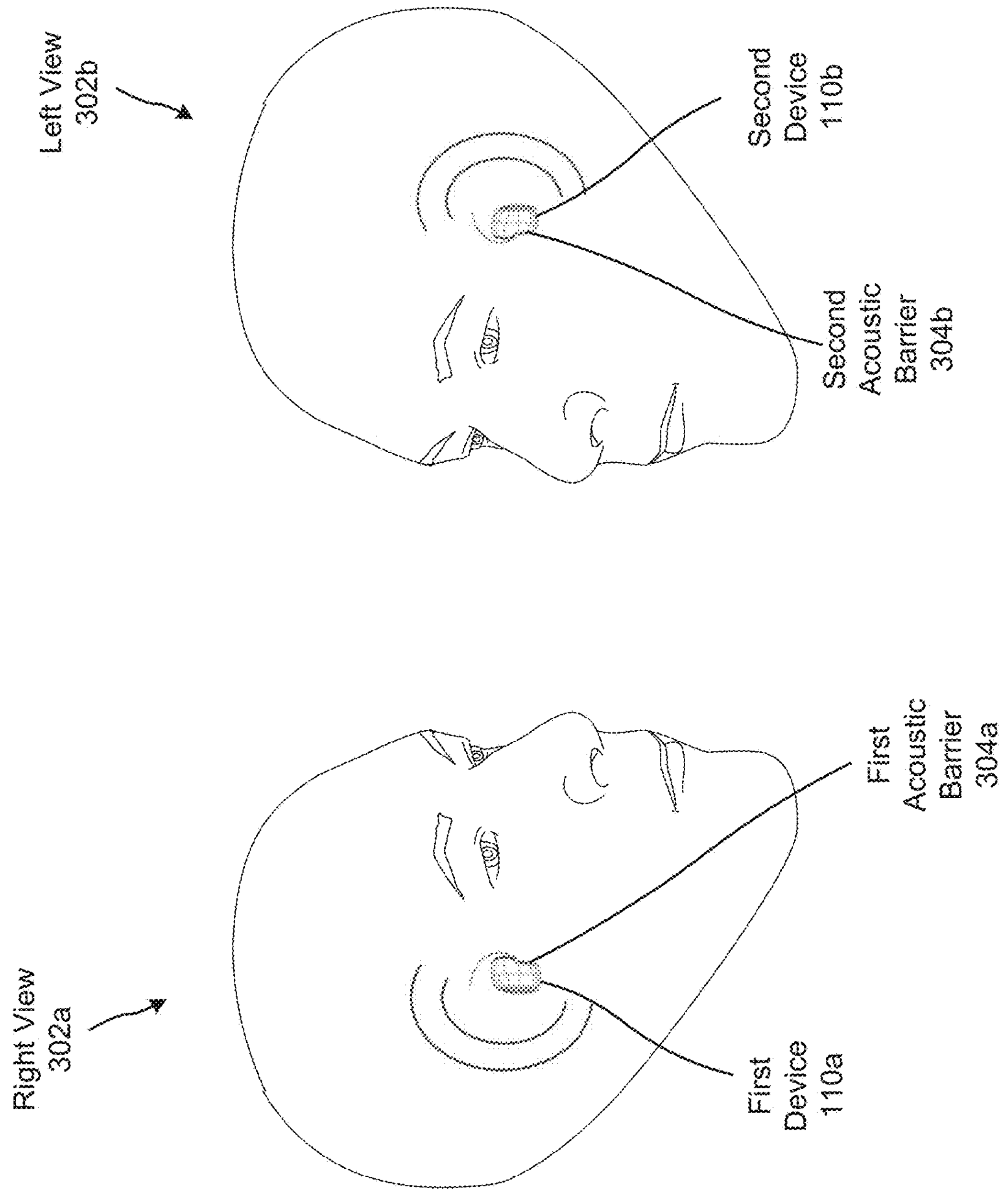
FIG. 3 is a diagram of a personal audio output device in use, according to embodiments of the present disclosure.

FIG. 3 is a diagram of a PAD 112 in use, according to embodiments of the present disclosure. FIG. 3 illustrates a right view 302*a* of the user 5 showing the first PAD 112*a*, and a left view 302*b* of the user 5 showing the second PAD 112*b*. The first PAD 112*a* may be associated with a first acoustic barrier 304*a*, and the second PAD 112*b* may be associated with a second acoustic barrier 304*b*.

An earbud may be shaped or formed such that, when an inner-lobe insert of the earbud is inserted in an ear canal of a user, the inner-lobe insert and the ear canal wall form an acoustic barrier, thereby wholly or partially blocking external audio from the inner ear of the user. This form of noise cancellation may be referred to herein as passive noise cancellation, as distinguished from active noise cancellation systems and methods, such as ANC. The external audio may be, for example, utterances by the user or others, traffic noise, music, or television audio. ANC techniques may be used in addition to the acoustic barrier to further quiet external audio. Sometimes, however, a user of the earbuds may want to hear the external audio. For example, the user may wish to speak to another person while wearing earbuds or may wish to hear environmental noise while wearing earbuds. The earbuds, and in particular the acoustic barrier, may, however, render this external audio difficult, unpleasant, or impossible to listen to. For example, the acoustic barrier may filter out a high-frequency portion of the external audio such that only a low-frequency portion of the external audio reaches the ear of the user. The user may find it difficult to, for example, distinguish speech in this low-frequency portion of the external audio. Moreover, sounds generated inside the body of the user—such as vibrations from speech, chewing noises, etc.—may seem or be louder due to the acoustic barrier.

The present disclosure is not, however, limited to only in-ear devices like earbuds and headphones and their associated acoustic barriers, and includes over-the-ear "clam shell" headphones, bone-conduction headphones, etc. Even cellular phone held near the ear of the user may be associated with a partial acoustic barrier.

Figure 4:
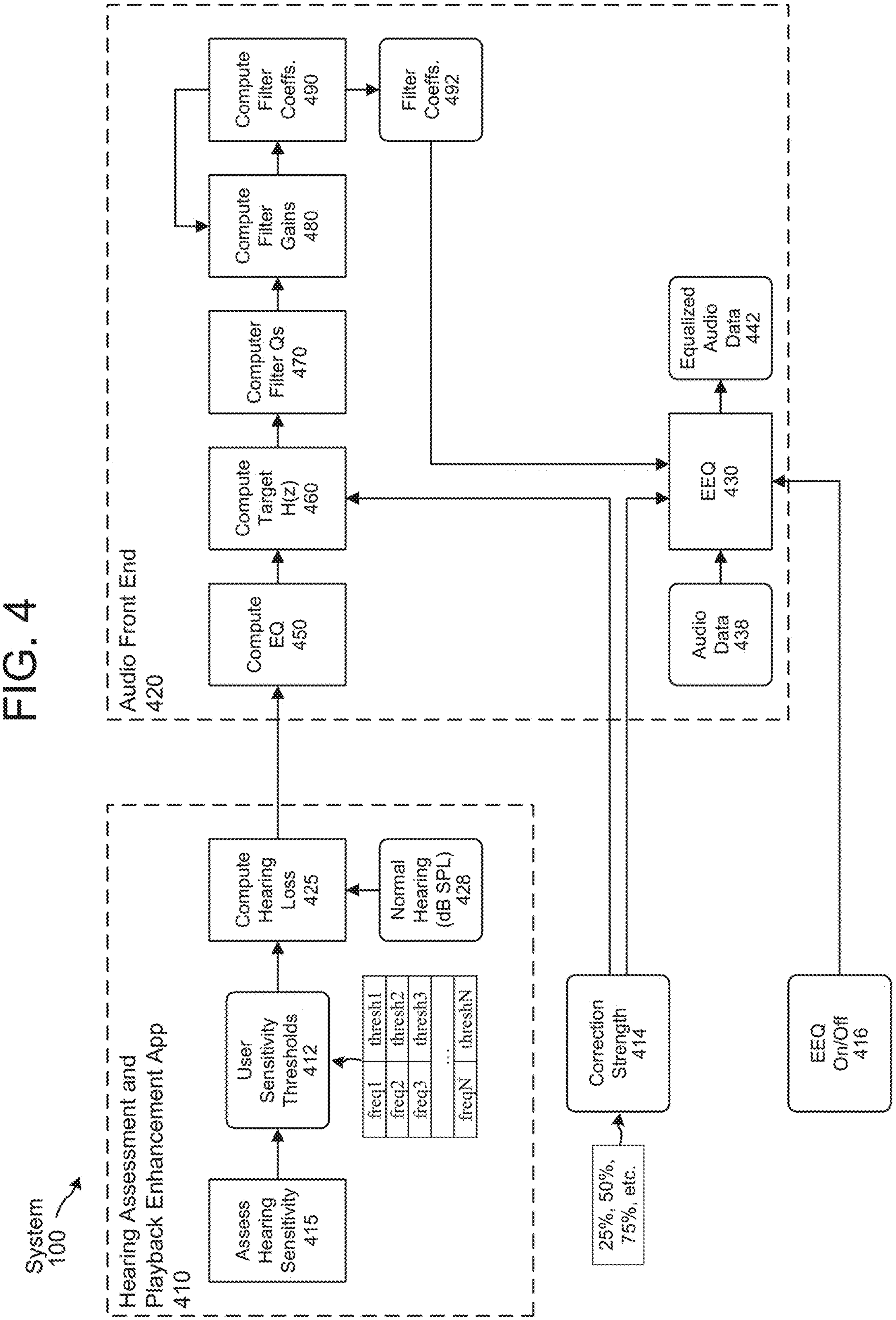
FIG. 4 is a conceptual diagram illustrating computation of the EEQ, according to embodiments of the present disclosure.

FIG. 4 is a conceptual diagram illustrating computation of the EEQ 430, according to embodiments of the present disclosure. The system 100 may include a hearing assessment and playback enhancement app (App) 410 configured to measure a user's hearing loss and provide an interface through which the user 5 can control the EEQ 430. The EEQ 430 may be a component, such as a digital signal processor (DSP) or other processor that can implement digital filters and/or other algorithms to increase/decrease amplitudes of portions of an audio signal within individual frequency bands. The frequency bands may collectively span the frequency range of human earing (e.g., ~20 Hz to ~20,000 Hz), less than the full range, or more than the full range. The frequency band may have various spacings; for example, octave spacing where a center frequency of each frequency band is double that of the adjacent lower frequency band. An example of octave frequency band spacing may include center frequencies at 32, 63, 125, 250, 500 Hz, 1 kHz, 2 kHz, 4 kHz, 8 kHz, 16 kHz, etc. In some implementations, the frequency spacing may be wider or narrower. In some implementations, the frequency bands may have some overlap; for example, the 500 Hz frequency band may range from 333 to 750 Hz while the 1 kHz frequency band may range from 666 Hz to 1.5 kHz, etc. Individual filters are computed to collectively achieve an approximation of a target transfer function. Interactions between individual filters that result from the overlap between frequency bands may cause the resulting EEQ 430 to deviate from the target transfer function. To compensate for the deviation, the coefficients of individual digital filters may be iteratively computed, as described further below.

The system 100 may include an audio front end 420 which includes the EEQ 430 as well as components for calculating filter coefficients 492 used to generate the EEQ. The App 410, audio front end 420, and/or the EEQ 430 may execute on one or more processors of the user device 110, PAD 112, and/or other system components 120. In some implementations, the App 410 and audio front end 420 components 450 through 490 may execute on the user device 110 while the EEQ 430 is a digital filter than executes on one or more processors of the first PAD 112*a* and/or second PAD 112*b* of a PAD 112.

The user 5 may launch the App 410, which may include a component 415 for assessing hearing sensitivity. The component 415 may control the PAD 112 to emit pure tones at various frequencies and at different output volume levels. The user 5 may provide an input via a GUI or other interface of the user device 110 to indicate whether or not they can hear the tone. The App 410 may collect the user sensitivity thresholds 412 as, for example, a set of frequency-threshold pairs. A frequency-threshold pair may specify a frequency (e.g., 250 Hz) and a corresponding to an output volume at which the user 5 reported hearing the tone (e.g., 35 dB SPL). The output volume of the PAD 112 may be measured (e.g., by one of the internal microphones 205*a* and/or 205*b*) and/or estimated based on the output volume setting. If the output volume is to be estimated, the App 410 may be preconfigured with information regarding how an output volume setting correlates with an output volume amplitude for the particular type/model of PAD 112. Such an estimate may be used as s proxy for a measured/calibrated output volume value. A component 425 may receive the user sensitivity threshold data 412 from the component 415 and generate an audiogram representing a graph of the user's hearing loss across different frequency bands. The user sensitivity threshold data 412 may be provided, for example, in dB SPL. The component 425 may use, as a reference, normal hearing sensitivity thresholds 428. The normal hearing sensitivity thresholds 428 may also be given in dB SPL. The component 425 may output an audiogram in, for example, dB HL representing the hearing loss of the user as a ratio as compared to normal hearing sensitivities.

The audio front end 420 may include components 450 through 490 for calculating filter coefficients 492 used to generate the EEQ 430. In some implementations, the system 100 will measure hearing in both ears and generate separate EEQs 430 for the right and left channels. The components 450-490 may include software and/or logic configured to perform various computations.

A component 450 may compute a target EQ to compensate for the measured hearing loss, and a component 460 will average hearing loss across all frequencies to generate a target transfer function (H(z)). Thus, while dB HL measurements may be positive across many, if not all, frequency bands, the target transfer function will average 0 dB or close to 0 dB across the frequency bands. In some implementations, the audio front end 420 may compute different target functions for various correction strengths 414. The audio front end 420 may proceed, via the steps described below, to calculate a set of filter coefficients 492 corresponding to each correction strength. In some implementations, the audio front end 420 may calculate a single set of filter coefficients 492 that correspond to one correction strength (e.g., 75% or 100%, etc.), and use analog and/or digital mixing of equalized and unequalized signals to achieve corrections strengths below the correction strength corresponding to the filter coefficients 492. This techniques is described in additional detail below with reference to FIGS. 8 and 9.

A component 470 may compute Q-factors for filters to boost or cut within each frequency band. For example, if the target transfer function reflects values that are similar between a first frequency band and its adjacent frequency bands, the Q-factor may be relatively low. If the target transfer function reflects that the adjacent frequency bands have values that are much higher/lower than the first frequency band, the Q-factor may be relatively high.

A component 480 may calculate filter gains; that is, how much each filter should boost or cut at its frequency such that together the filters approximate the target transfer function as determined by the component 460. With the Qs and gains thus determined, a component 490 can calculate the filter coefficients 492. However, because the filters thus calculated may interact in ways that are difficult to predict, the resulting transfer function of the combined filters may differ from the target transfer function. Thus, the system 100 may adjust the filter gains and/or Q-factors and recalculating the filter coefficients. By iteratively adjusting the Q and/or gain values and recalculating the filter coefficients, the system 100 may reduce the error between the resulting transfer function and the target transfer function. The system 100 may repeat the computations (e.g., of the components 480-490 or 470-490) until an error between the filters' transfer function and the target transfer function falls below a threshold and/or until a given number of iterations have completed. In some implementations, the system 100 may perform 20 iterations of the computation. In various implementations, the system 100 may perform between 10 and 30 iterations of the computation. In various implementations, the system 100 may perform more or fewer iterations of the computation.

Once the final filter coefficients 492 have been determined, the system 100 may use them to generate the EEQ 430. The resulting EEQ 430 may receive audio data 438 for output and apply the filters to generate the equalized audio data 442 for output. A signal 416 may switch the EEQ 430 on and off by. The user 5 may switch the EEQ 430 on and off via, for example, user settings of the App 410. The user 5 may similarly control a correction strength of the EEQ 430 via user settings of the App 410 or otherwise sending a correction strength signal 414 to the audio front end 420.

Figure 5:
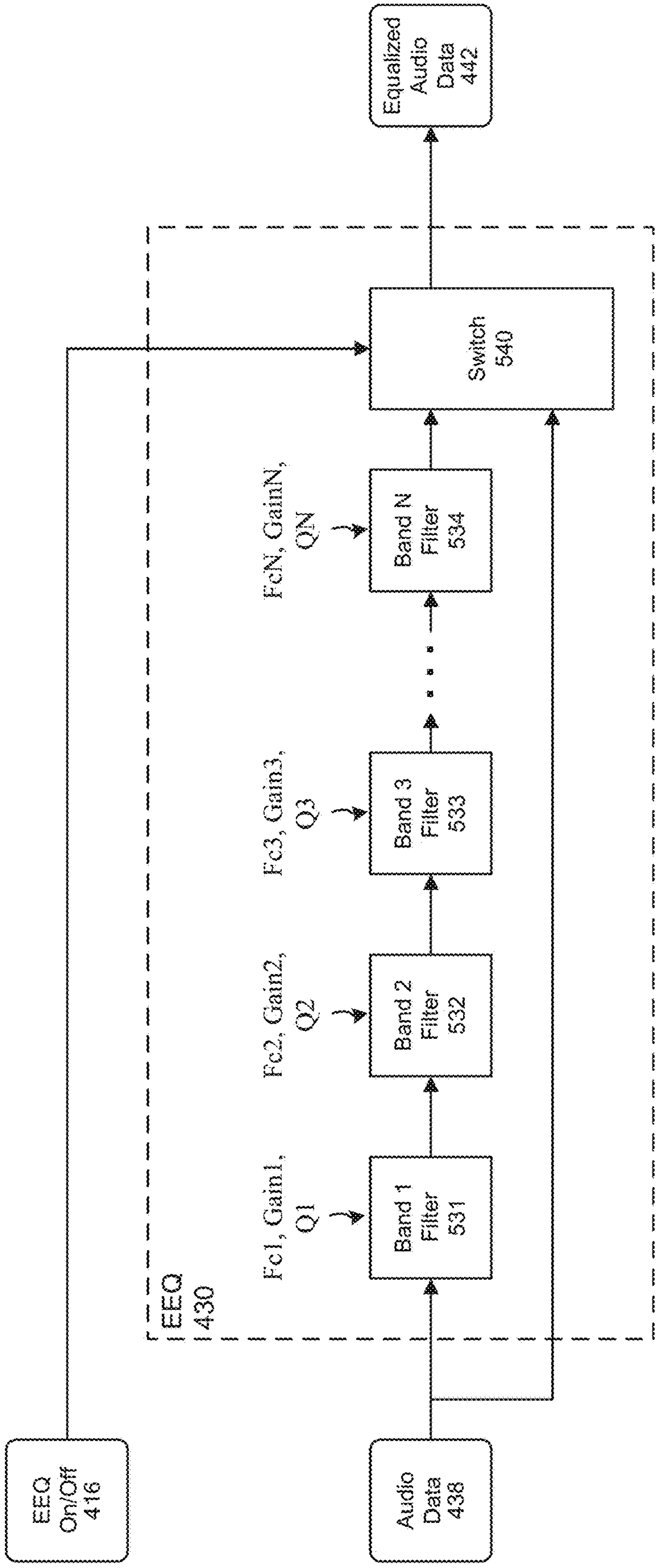
FIG. 5 is a conceptual diagram illustrating an example implementation of the EEQ using biquad filters, according to embodiments of the present disclosure.

In some implementations, the filters may be arranged in a cascade architecture, with the audio data 438 processed by each individual filter in turn. FIG. 5 is a conceptual diagram illustrating an example implementation of the EEQ 430 using biquad filters, according to embodiments of the present disclosure. The EEQ 430 may include a plurality of biquad filters 531, 532, 533, 534, etc. A filter may correspond to a frequency gain; for example, the band 1 filter 531 may correspond to a first frequency, a first Q, and a first gain, etc. A filter may have coefficients as determined in the manner described previously. The EEQ 430 may receive audio data 438 for output, and process it with each filter 531, 532, 533, 534, etc., in turn to generate the equalized audio data 442.

In some implementations, the user 5 may be able to switch the EEQ 430 on and off using a control signal 416. The control signal 416 may actuate a switch 540. When the EEQ 430 is switched on, it may output the equalized audio data 442. When the EEQ 430 is switched off, it may output the unequalized audio data 438.

FIG. 6 is a graph representing example transfer functions of EEQs at various levels of correction strength, and an example actual response of an EEQ, according to embodiments of the present disclosure. A first line 610 represents a transfer function that would result in an EEQ with a correction strength of 100%. The transfer function represented by the first line 610 would correct for the full reduction in threshold sensitivity of the user as indicated by the hearing test.

A second line 620 represents a transfer function of an EEQ at 50% correction strength. For example, each frequency band is boosted by an amount corresponding to half the measured reduction in threshold sensitivity relative to normal hearing ranges.

Figure 8A:
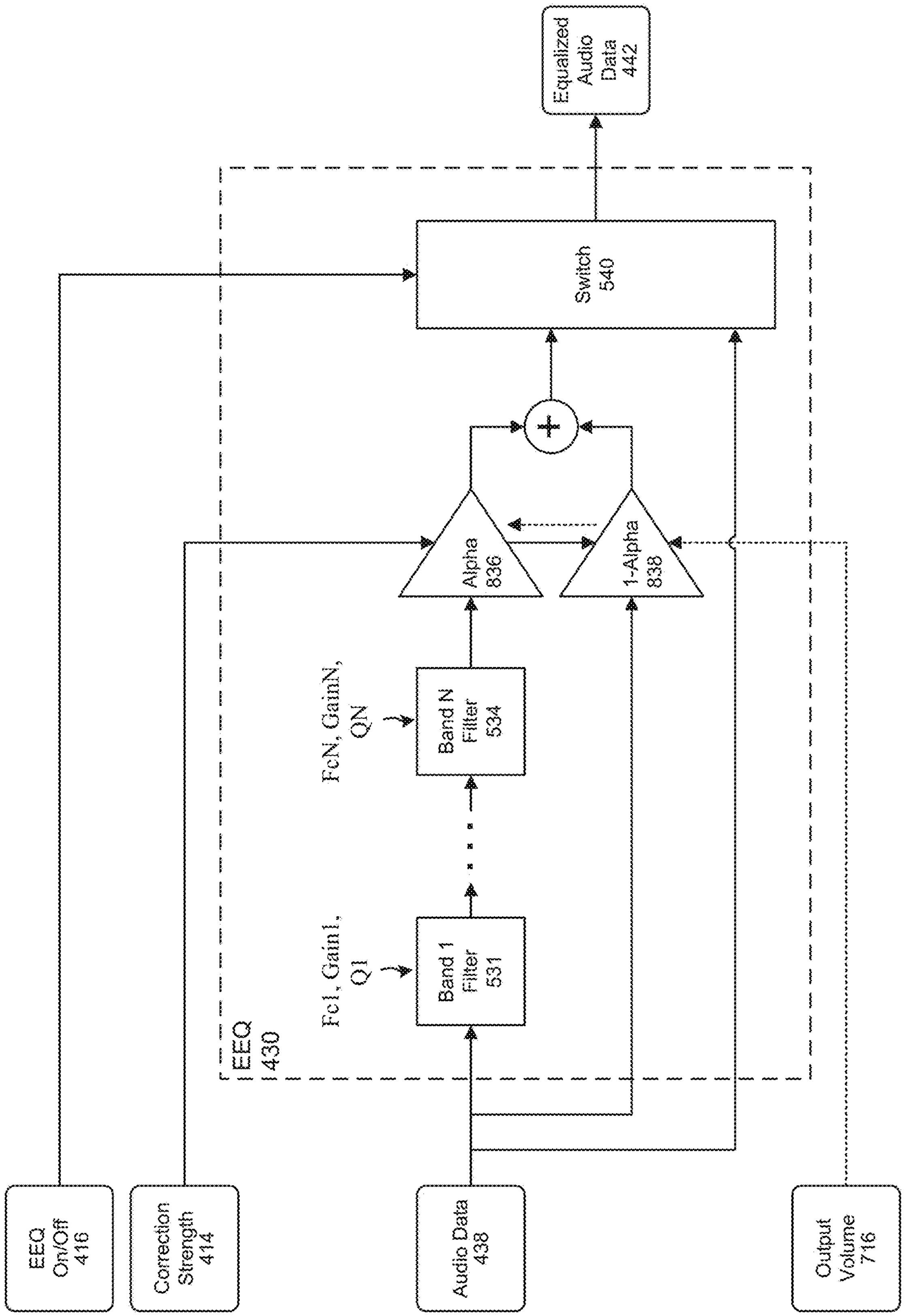
FIG. 8A is a conceptual diagram illustrating a first example implementation of an EEQ with adjustable correction strength, according to embodiments of the present disclosure.

A third line 630 represents a transfer function corresponding to a correction strength of 50% with the average subtracted; that is, with an average boost/cut for all frequency ranges averaging to 0 dB. The third line 630 may represent a target transfer function for computing an EEQ with a correction strength of 50%. In some implementations, however, the target transfer function may be computed for different correction strengths (e.g., 75% or 100%), and further adjustments of correction strength during playback may be accomplished by mixing equalized and unequalized signals as shown in FIG. 8A and described below.

A fourth (dotted) line 640 represents the transfer function of the actual EEQ following coefficient computation. The system 100 can iterate Q, gain, and/or coefficient calculations until the EEQ actual response approximates the target transfer function.

Figure 7:
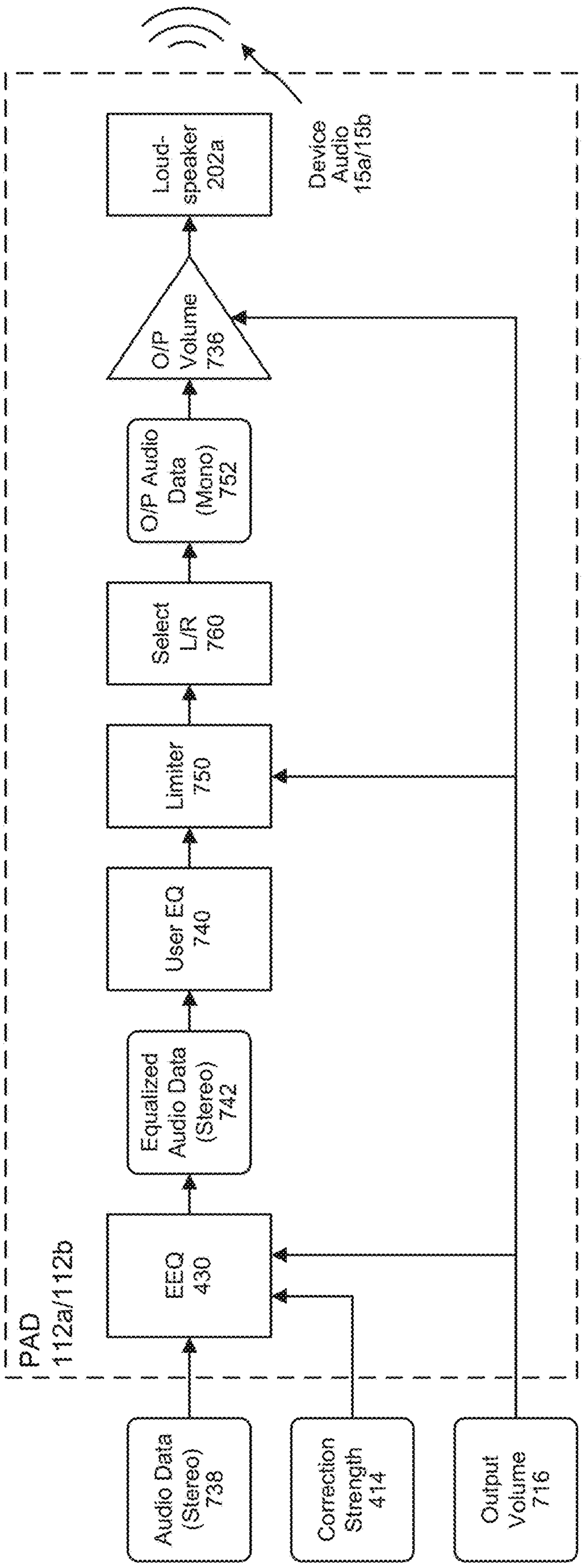
FIG. 7 is a conceptual diagram illustrating an example implementation of the EEQ in a PAD, according to embodiments of the present disclosure.

FIG. 7 is a conceptual diagram illustrating an example implementation of the EEQ 430 in a PAD 112, according to embodiments of the present disclosure. The components shown in FIG. 7 can correspond to a single PAD 112*a* or 112*b*. The operations may be performed in a PAD 112*a* or 112*b*, on a user device 110, or on some other system component 120. The components/operations shown in FIG. 7 may correspond to a single channel; for example, a right ear channel or a left ear channel. Despite corresponding to a single channel, however, the implementation shown in FIG. 7 may receive stereo audio data 738 (e.g., both left and right channels), and perform some processing using both channels of audio, and some processing using only the audio channel corresponding to a particular PAD 112*a* or 112*b* (e.g., the right ear or left ear).

The EEQ 430 may receive the stereo audio data 738 and process both channels individually to output equalized stereo audio data 742. In some implementations, the EEQ 430 may process the stereo audio data 738 taking into account a correction strength 414. In some implementations, the EEQ 430 may process the stereo audio data 738 taking into account an output volume setting 716. The EEQ 430 may use the output volume setting 716 to determine a volume-dependent correction strength.

In some implementations, a user EQ 740 may receive the stereo equalized audio data 742 and process it according to user-selected equalizer settings. For example, the user 5 may boost and/or cut different frequency ranges, independently of the equalization provided by the EEQ 430. In some implementations, the user EQ 740 may include filters similar to those of the EEQ 430 and may, in some cases, be implemented in the same hardware (e.g., the same DSP). The user EQ 740 may send stereo audio data to the limiter 750.

In some implementations, a limiter 750 may receive stereo audio data and determine whether an amplitude of one or both channels exceeds an amplitude limit. Such limiting circuitry can prevent damage to the loudspeakers 202*a* and 202*b* and/or prevent the PAD 112 from outputting dangerous SPLs to the user's ears. The limiter 750 may also manage headroom of the output volume amplifier 736 to ensure that the output volume amplifier 736 can amplify the full dynamic range of audio signal sent to it (e.g., mono audio data 752) without saturating and/or distorting. In some implementations, the limiter 750 in each PAD 112*a* or 112*b* can process audio for both the left and the right channels. In this manner, if the audio signal is asymmetric in amplitude (e.g., only one of the left or right channels has an amplitude that exceeds the limit), both PADs 112*a* and 112*b* can reduce their output volume symmetrically. In some implementations, the PAD 112*a* or 112*b* may implement multiple limiters. For example, the PAD 112 may implement a peak limiter and/or an RMS limiter. A peak limiter may have a fast attack and release, and prevent over excursion of the loudspeaker 202 and/or injury to the ear resulting from loud transient sounds. An RMS limiter (corresponding to root mean square power) may limit sustained output of loud sounds. In some implementations, both types of limiters may have volume-dependent thresholds; for example, such that the limit is set higher for higher volume settings, and lower for lower volume settings. In some implementations, the limiter 750 may include two or more bands, in which one or more crossovers separates the audio signal into a high band (e.g., frequency content over 250 Hz) and a low band (e.g., frequency content below 250 Hz). Separate RMS and/or peak limiters may be applied to each band, and the signals may be recombined into a full-range audio signal.

From the output of the limiter 750, however, the PAD 112*a* or 112*b* may perform additional processing on only a single audio channel, thereby preserving processor resources of the PAD 112*a* or 112*b*. A component 760 may select a left or right channel for additional processing, amplification, and output. Such additional processing may include, for example, volume-based speaker EQ to adjust for non-linearities of the loudspeakers 202, ANC compensation EQ to adjust for low frequency reduction of ANC, etc. The PADs 112*a* and 112*b* may then amplify the mono audio signal with an output volume amplifier 736. Finally the loudspeaker 202*a* or 202*b* can output the amplified signal as device audio 15*a* or 15*b*.

Figure 8B:
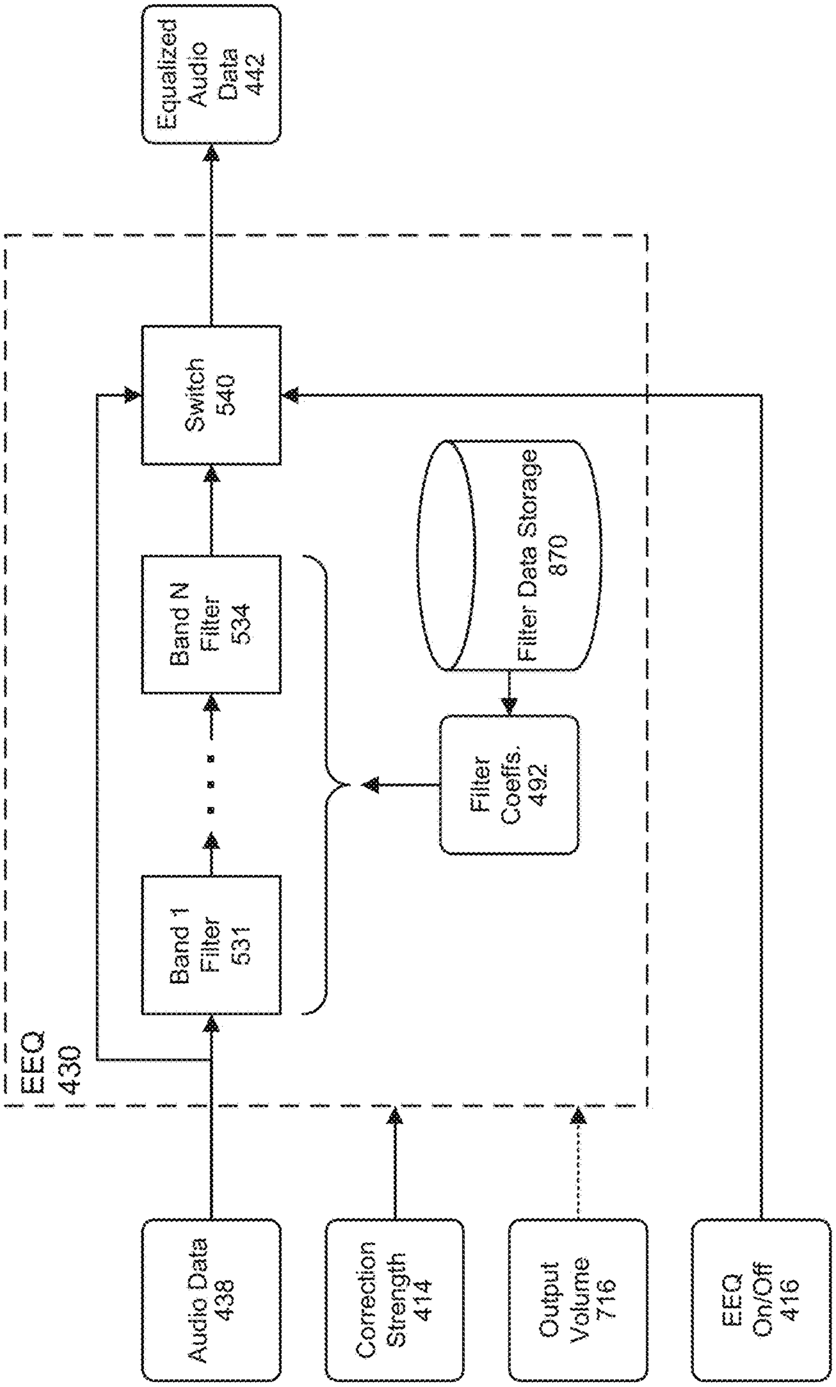
FIG. 8B is a conceptual diagram illustrating a second example implementation of an EEQ with adjustable correction strength, according to embodiments of the present disclosure.

FIGS. 8A and 8B are conceptual diagrams illustrating example implementations of EEQ 430 with adjustable correction strength, according to embodiments of the present disclosure. In some implementations, the system 100 may include features that allow a user to adjust the correction strength of the EEQ 430. For example, the user 5 may not wish the audio output to be fully corrected and/or may wish to provide different levels of correction for different types of audio (e.g., more correction for spoken word versus less for music, or vice-versa). The system 100 may allow the user to select a correction strength; for example, to boost frequency bands by only 25, 50, 75%, etc., of the amount determined by the hearing test. For example, if the user exhibits a hearing loss of 40 dB HL within a frequency band, selecting a correction strength of 75% may result in the enhancement equalizer boosting that frequency band by only 30 dB, etc.

A correction strength of less than 100% may correspond to a different EQ profile than a fully correcting EQ due to the filter having different Q-factors (e.g., slopes) and/or gains at each frequency band. Thus, a set of filters corresponding to a fully correcting EQ may have different coefficients than a set of filters corresponding to a partially correcting EQ. Computing and/or storing multiple sets of filter coefficients corresponding to the different correction strengths may require additional resources. Alternatively, the system 100 may implement correction strength adjustment by mixing the unequalized (e.g., pre-EQ) signal with the equalized signal in calibrated ratios. To provide a desired correction strength, the system 100 may determine a ratio (e.g., "alpha") for mixing the equalized and unequalized signals. The perceived correction strength may not correspond linearly to the value of the ratio. Thus, the system 100 may determine a value for the ratio by mixing the signals for different levels of alpha and finding a value that results in the desired transfer function. Alternatively or additionally, the user 5 may select the ratio directly.

The mixing ratio may be implemented by apply respective gains to the equalized and unequalized audio data. For example, the EEQ 430 may apply an alpha gain 836 to the equalized signal and a 1-alpha gain 838 to the unequalized signal, where alpha is a value less than 1 that represents the ratio of the equalized signal to the unequalized signal in the output equalized audio data 442. The outputs of the gains 836 and 838 may be summed to yield the equalized audio data 442. During playback, the user 5 may control the correction strength (e.g., via the App 410) by sending a correction strength signal 414 to the EEQ 430. The EEQ 430 will thus mix the equalized and unequalized audio signals using an alpha that corresponds to the desired correction strength.

In some implementations, the system 100 may implement a correction strength that is volume dependent, such that at low overall output volumes the correction strength may be 75%, at moderate volumes the correction strength may be 50%, and at high volumes the correction strength may be 25%, etc. Applying a lower correction strength at higher output volumes may avoid overwhelming the listener with heavily-boosted frequency bands, and may additionally avoid triggering an output limiter of the PAD 112. The output volume setting 716 may be used to adjust the alpha gain 836 and the 1-alpha gain 838 to achieve the desired volume dependent correction strength for a given value of the correction strength setting 414.

In some implementations, the user 5 may be able to switch the EEQ 430 on and off using a control signal 416. The control signal 416 may actuate a switch 540. When the EEQ 430 is switched on, it may output the equalized audio data 442. When the EEQ 430 is switched off, it may output the unequalized audio data 438.

FIG. 8B is a conceptual diagram illustrating a second example implementation of and EEQ 430 with adjustable correction strength, according to embodiments of the present disclosure. The EEQ 430 can receive the correction strength 414 and output volume 716, and use them to select filter coefficients 492. Filter coefficients 492 for various values of correction strength and/or volume may have been previously calculated (e.g., as described above with reference to FIG. 4), and may be stored in, for example, a filter data storage 870. The filter data storage 870 may be a volatile or non-volatile memory or storage medium. The filter data storage 870 may further include a lookup table or other data structure for identifying filter coefficients 492 corresponding to a particular combination of correction strength 414 and output volume 716. The selected filter coefficients 492 can be used to configure the filter bands 531 through 534; for example, in a DSP. The transfer function of the resulting filter will correspond to the desired correction strength for the selected volume setting. As in the first example EEQ 430 shown in FIG. 8A, the EEQ 430 may be turned on or off (e.g., engaged or bypassed) based on an on/off signal 416 going to the switch 540, which will select either equalized or unequalized audio for output.

Figure 9A:
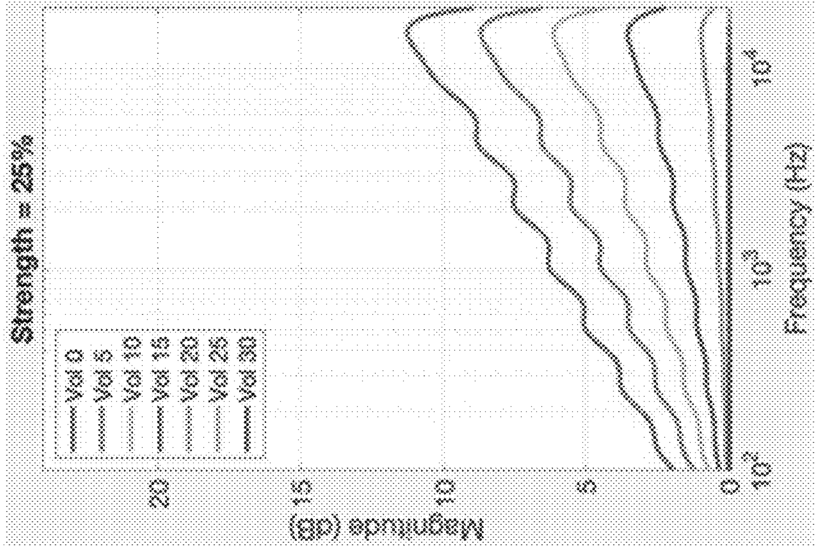
FIGS. 9A through 9C are graphs representing example target transfer functions of EEQs at various levels of correction strength and output volume, according to embodiments of the present disclosure.
Figure 9B:
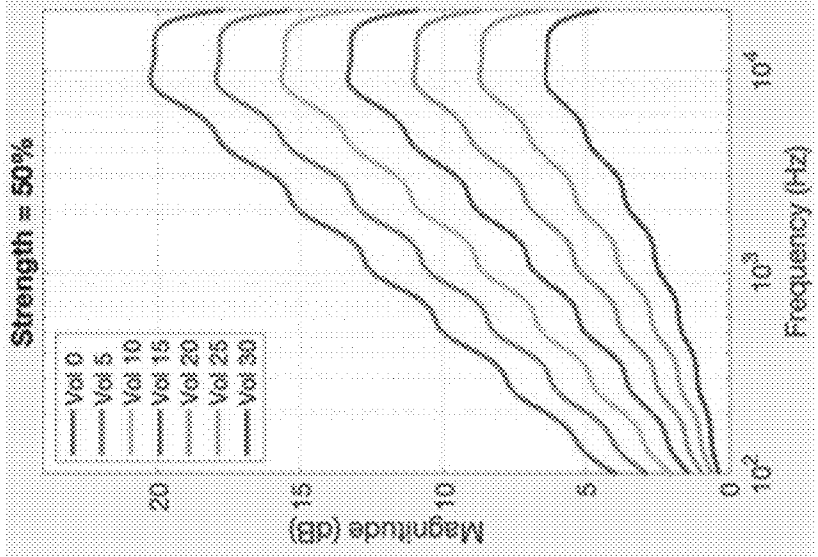
Figure 9C:
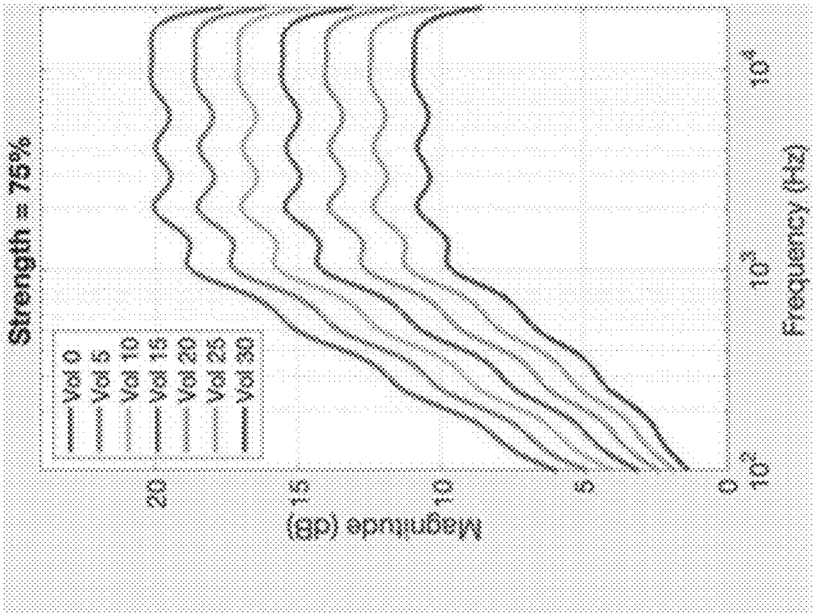

FIGS. 9A through 9C are graphs representing example target transfer functions of EEQs at various levels of maximum correction strength and output volume, according to embodiments of the present disclosure. The graphs illustrate volume-dependent equalization. The horizontal axis of the graphs represents frequency (e.g., roughly 100 Hz to 10 kHz), and the vertical axis represents gain in dB (e.g., relative to the unequalized signal at each frequency). In each figure, a correction strength of the EEQ increases inversely with the volume setting up to a maximum correction strength. In some implementations, the maximum correction strength may be selected by the user (e.g., 25%, 50%, 75%, etc.). In each graph, the relative "shape" of the EEQ transfer function remains similar for the selected maximum correction strength. The scale of the EEQ transfer function in dB, however, becomes compressed at higher volume settings.

FIG. 9A shows a maximum correction strength of 25% to be applied at a lowest volume setting (e.g., Vol=0). For each successive volume setting (e.g., Vol=5, 10, 15, etc.) the correction strength of the EEQ is reduced until it is essentially flat at max volume (e.g., Vol=30). FIG. 9B shows a maximum correction strength of 50% at the minimum volume setting, with the correction strength gradually decreasing with increasing volume settings. In the example shown in FIG. 9B, however, the EEQ never becomes flat; rather, some EEQ is present at all volume settings. FIG. 9C shows a maximum correction strength of 75%. Although representing a higher maximum correction strength than FIG. 9B, the graph in FIG. 9C shows a similar maximum EEQ boost of about 20 dB. As in FIGS. 9A and 9B, increasing output volume settings correspond to decreasing correction strengths.

Figure 10:
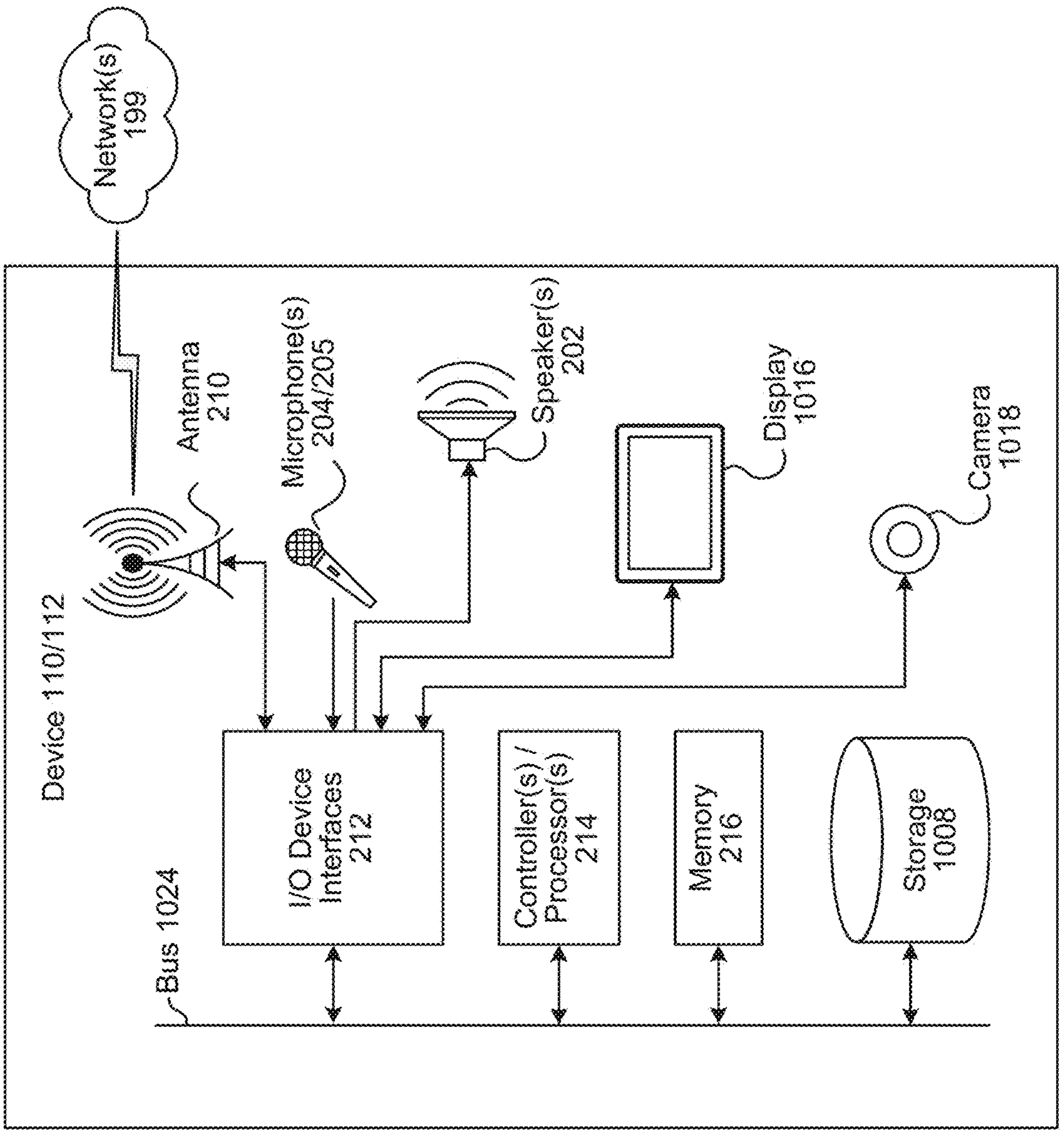
FIG. 10 is a block diagram conceptually illustrating example components of a device, according to embodiments of the present disclosure.

FIG. 10 is a block diagram conceptually illustrating a device such as a user device 110 and/or a PAD 112. Device(s) 110/112 may include one or more controllers/processors 214, which may each include a central processing unit (CPU) for processing data and computer-readable instructions and a memory 216 for storing data and instructions of the respective device. The memories 216 may individually include volatile random-access memory (RAM), non-volatile read-only memory (ROM), non-volatile magnetoresistive (MRAM) memory, and/or other types of memory. Each device may also include a data-storage component for storing data and controller/processor-executable instructions. Each data-storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces.

Computer instructions for operating device(s) 110/112 and their various components may be stored in a storage 1008, executed by the respective device's controller(s)/processor(s) 214, using the memory 216 as temporary "working" storage at runtime. A device's computer instructions may be stored in a non-transitory manner in the memory 216, storage 1008, or an external device(s). Alternatively, some or all of the executable instructions may be embedded in hardware or firmware on the respective device in addition to or instead of software. Device(s) 110/112 may additionally include a display 1016 for displaying content. Device(s) 110/112 may further include a camera 1018.

Device(s) 110/112 may include input/output device interfaces 212. A variety of components may be connected through the input/output device interfaces, as will be discussed further below. Additionally, each device(s) 110/112 may include an address/data bus 1024 for conveying data among components of the respective device. Each component within device(s) 110/112 may also be directly connected to other components in addition to (or instead of) being connected to other components across the bus 1024.

For example, via the one or more antenna(s) 210, the input/output device interfaces 212 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

While the device(s) 110/112 may operate locally to a user (e.g., within a same environment so the device may receive inputs and playback outputs for the user), some system component(s) 120 may be located remotely from the device(s) 110/112 (e.g., because their operations may not require proximity to the user). Some system component(s) 120 may be located in an entirely different location from the device(s) 110/112 (for example, as part of a cloud computing system or the like) or may be located in a same environment as the device(s) 110/112 but physically separated therefrom (for example a home server or similar device that resides in a user's home or business but perhaps in a closet, basement, attic, or the like). The system component(s) 120 may also be a version of a user device 110 that includes different (e.g., more) processing capabilities than other user device(s) 110 in a home/office. One benefit to the system component(s) 120 being in a user's home/business is that data used to process a command/return a response may be kept within the user's home, thus reducing potential privacy concerns.

Figure 11:
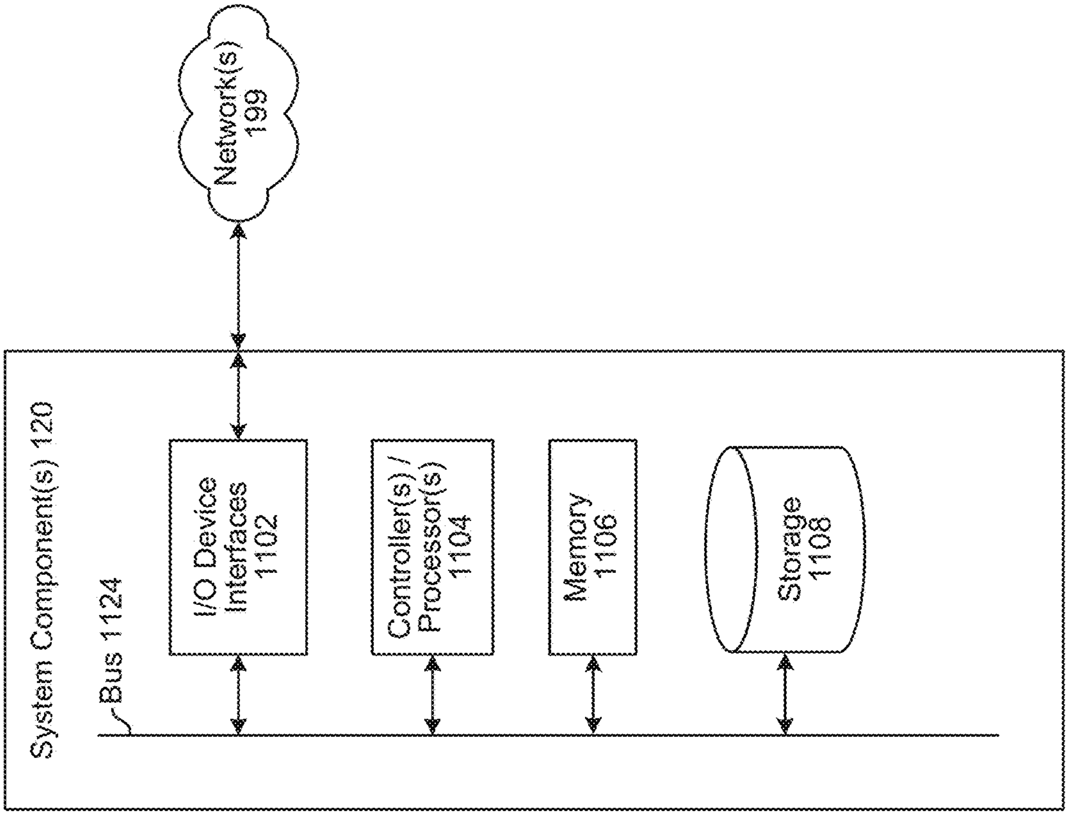
FIG. 11 is a block diagram conceptually illustrating example components of a system, according to embodiments of the present disclosure.

FIG. 11 is a block diagram conceptually illustrating example components of a system component 120. One or more system components 120 may be included in the overall system 100 of the present disclosure. In operation, each of these systems may include computer-readable and computer-executable instructions that reside on the respective system component 120, as will be discussed further below.

The system component(s) 120 may include one or more controllers/processors 1104, which may each include a central processing unit (CPU) for processing data and computer-readable instructions, and a memory 1106 for storing data and instructions of the respective device. The memories 1106 may individually include volatile random access memory (RAM), non-volatile read only memory (ROM), non-volatile magnetoresistive memory (MRAM), and/or other types of memory. The system component(s) 120 may also include a data storage component 1108 for storing data and controller/processor-executable instructions. Each data storage component 1108 may individually include one or more non-volatile storage types such as magnetic storage, optical storage, solid-state storage, etc. The system component(s) 120 may also be connected to removable or external non-volatile memory and/or storage (such as a removable memory card, memory key drive, networked storage, etc.) through respective input/output device interfaces 1102.

Computer instructions for operating the system component(s) 120 may be executed by the processor(s) 1104, using the memory 1106 as temporary "working" storage at runtime. A device's computer instructions may be stored in a non-transitory manner in non-volatile memory 1106, data storage component 1108, or an external device(s). Alternatively, some or all of the executable instructions may be embedded in hardware or firmware on the respective device in addition to or instead of software.

The system component(s) 120 includes input/output device interfaces 1102. A variety of components may be connected through the input/output device interfaces 1102, as will be discussed further below. Additionally, the system component(s) 120 may include an address/data bus 1124 for conveying data among components of the respective device. Each system component 120 may also be directly connected to other components in addition to (or instead of) being connected to other components across the bus 1124.

Figure 12:
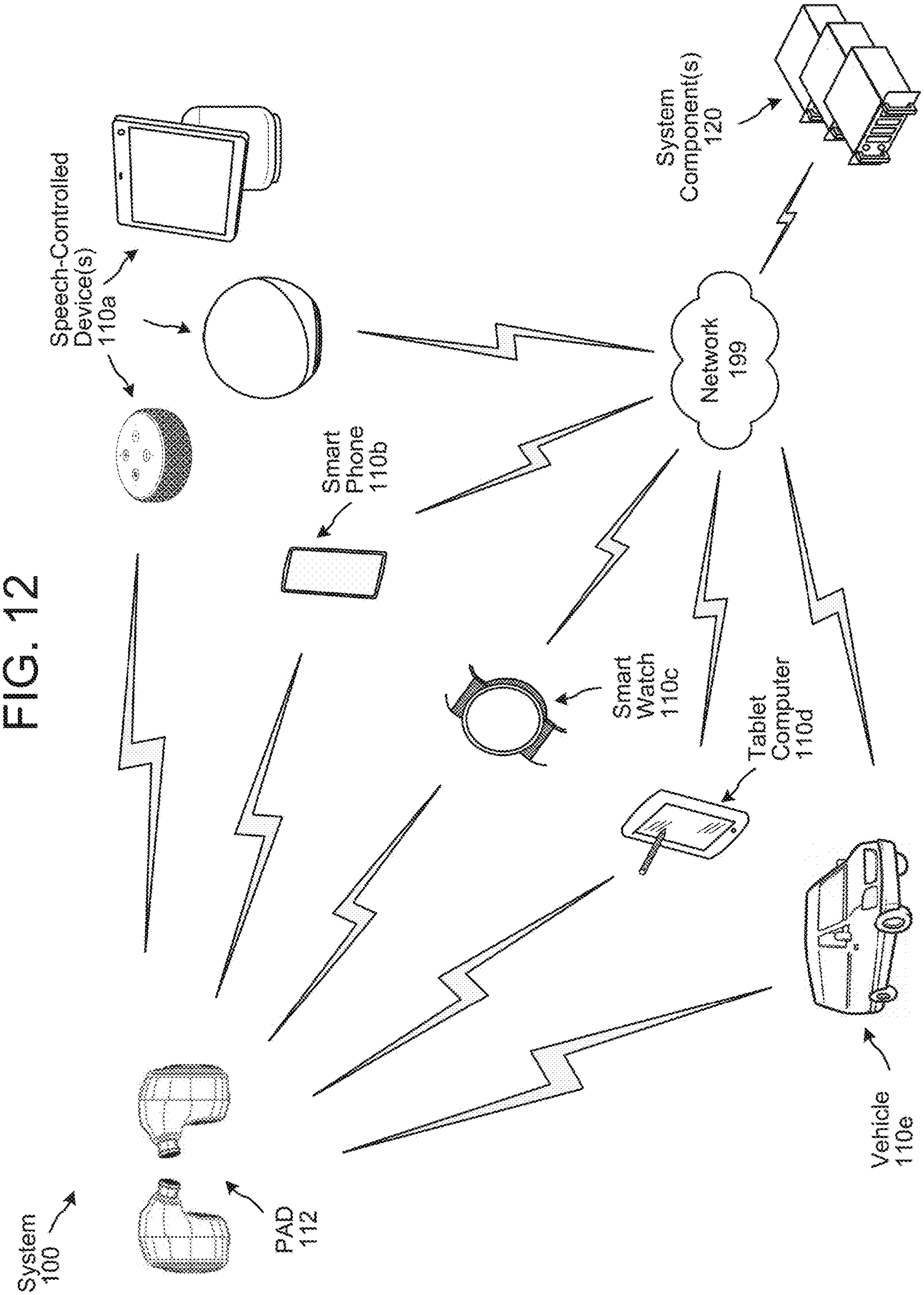
FIG. 12 illustrates an example of a computer network for use with the overall system, according to embodiments of the present disclosure.

As illustrated in FIG. 12, multiple devices 110/112/120 may contain components of the system 100 and the devices may be connected over a network 199. The network 199 may include one or more local-area or private networks and/or a wide-area network, such as the Internet. Local devices may be connected to the network 199 through either wired or wireless connections. For example, a speech-controlled device 110*a*, a smart phone 110*b*, a smart watch 110*c*, a tablet computer 110*d*, and/or a vehicle 110*e* may be connected to system component(s) 120 over the network 199. One or more system component(s) 120 may be connected to the network 199 and may communicate with the other devices therethrough. The PAD 112 may similarly be connected to the system component(s) 120 either directly or via a network connection to one or more of the user devices 110.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method comprising, by a personal audio output device (PAD):

determining, based on a user input in response to an audible output from the PAD, first data representing:

a first threshold sensitivity of a user to a first portion of the audible output in a first frequency band, and a second threshold sensitivity of the user to a second portion of the audible output in a second frequency band;

determining, using the first data, second data representing a first transfer function for partially compensating for the first threshold sensitivity and the second threshold sensitivity;

computing third data representing first coefficients for a first set of filters having a second transfer function corresponding to the first transfer function;

configuring, using at least the third data, a first equalizer component of the PAD;

generating, using first audio data and the first equalizer component, equalized first audio data; and outputting first audio corresponding to the equalized first audio data.

2. The method of claim 1, further comprising:

receiving a first value representing a first correction strength;

determining, using the second data and the first value, fourth data representing a third transfer function, wherein the third transfer function represents the first transfer function scaled by the first value;

determining a first ratio for mixing unequalized audio data with audio data equalized using the first equalizer component to approximate the third transfer function;

mixing the first audio data with the equalized first audio data at the first ratio to generate second audio data; and outputting second audio corresponding to the second audio data.

3. The method of claim 2, wherein the first value represents a desired correction strength at a first volume setting, the method further comprising:

receiving a second value representing a second desired correction strength at a second volume setting, wherein the second volume setting represents a higher device output volume than the first volume setting, and the second value represents a lower correction strength than the first value;

determining, using the second data and the second value, fifth data representing a fourth transfer function, wherein the fourth transfer function represents the first transfer function scaled by the second value; and determining a second ratio for mixing audio data equalized using the first equalizer component with unequalized audio data to approximate the fourth transfer function.

4. The method of claim 1, further comprising:

determining, using the second data, a first gain corresponding to the first frequency band;

determining, using the second data, a first difference in gain between the first frequency band and a second frequency band, wherein the second frequency band is adjacent to and has a lower frequency than the first frequency band;

determining, using the second data, a second difference in gain between the first frequency band and a third frequency band, wherein the third frequency band is adjacent to and has a higher frequency than the first frequency band;

determining, using the first difference and the second difference, a first Q-factor corresponding to the first frequency band;

determining, using the first gain and the first Q-factor, second coefficients for a first filter; and determining the first coefficients using at least the second coefficients and third coefficients for a second filter corresponding to the second frequency band, wherein the first set of filters include at least the first filter and the second filter.

5. The method of claim 4, wherein determining the first coefficients includes repeating the operations of determining the first gain and determining the second coefficients to reduce an error between the first transfer function and a transfer function of a set of filters.

6. The method of claim 1, wherein:

the PAD is a first PAD corresponding to a left ear;

a second PAD corresponds to a right ear, and the second PAD includes a second equalizer component corresponding to a second set of filters different from the first set of filters.

7. The method of claim 1, further comprising:

receiving a first indication of a first volume setting corresponding to output of the first audio;

receiving a second indication of a second volume setting, different from the first volume setting, corresponding to output of second audio;

reconfiguring, using the second indication, the first equalizer component, the reconfigured first equalizer component corresponding to a third transfer function different from the second transfer function;

receiving second audio data for output by the PAD;

generating, using the second audio data and the reconfigured first equalizer component, equalized second audio data; and outputting the second audio corresponding to the equalized second audio data.

8. The method of claim 1, wherein:

the PAD is a first PAD corresponding to a right ear, a second PAD corresponds to a left ear, the first equalizer component is implemented by at least a first processor of the first PAD, a second equalizer component is implemented by at least a second processor of the second PAD, and the method further comprises:

generating, using second audio data and the second equalizer component, equalized second audio data; and outputting, from the second PAD, third audio corresponding to the equalized second audio data.

9. The method of claim 1, wherein the PAD is a first PAD corresponding to a right ear and a second PAD corresponds to a left ear, the method further comprising:

causing third audio data to be equalized by a second equalizer component prior to output by the second PAD, the first equalizer component corresponding to the first PAD;

processing, using at least a first processor of the first PAD, the equalized second audio data to determine a first audio amplitude representing an output volume of the first PAD;

processing, using the at least first processor, the equalized third audio data to determine a second audio amplitude representing an output volume of the second PAD;

determining that one or more of the first audio amplitude or the second audio amplitude exceeds a limit; and in response to determining that one or more of the first audio amplitude or the second audio amplitude exceeds the limit, reducing an output volume setting of the first PAD.

10. The method of claim 1, wherein the first set of filters includes a first biquadratic filter corresponding to the first frequency band and a second biquadratic filter corresponding to the second frequency band.

11. A system, comprising:

at least one processor; and at least one memory comprising instructions that, when executed by the at least one processor, cause the system to:

determine, based a user input in response to an audible output from a personal audio output device (PAD), first data representing:

a first threshold sensitivity of a user to a first portion of the audible output in a first frequency band, and a second threshold sensitivity of the user to a second portion of the audible output in a second frequency band;

determine, using the first data, second data representing a first transfer function for partially compensating for the first threshold sensitivity and the second threshold sensitivity;

compute third data representing first coefficients for a first set of filters having a second transfer function corresponding to the first transfer function;

configure, using at least the third data, a first equalizer component of the PAD;

generate, using first audio data and the first equalizer component, equalized first audio data; and output first audio corresponding to the equalized first audio data.

12. The system of claim 11, wherein the at least one memory further includes instructions that, when executed by the at least one processor, further cause the system to:

receive a first value representing a first correction strength;

determine, using the second data and the first value, fourth data representing a third transfer function, wherein the third transfer function represents the first transfer function scaled by the first value;

determine a first ratio for mixing unequalized audio data with audio data equalized using the first equalizer component to approximate the third transfer function;

mix the first audio data with the equalized first audio data at the first ratio to generate second audio data; and output second audio corresponding to the second audio data.

13. The system of claim 12, wherein the first value represents a desired correction strength at a first volume setting, and the at least one memory further includes instructions that, when executed by the at least one processor, further cause the system to:

receive a second value representing a second desired correction strength at a second volume setting, wherein the second volume setting represents a higher device output volume than the first volume setting, and the second value represents a lower correction strength than the first value;

determine, using the second data and the second value, fifth data representing a fourth transfer function, wherein the fourth transfer function represents the first transfer function scaled by the second value; and determine a second ratio for mixing audio data equalized using the first equalizer component with unequalized audio data to approximate the fourth transfer function.

14. The system of claim 11, wherein the at least one memory further includes instructions that, when executed by the at least one processor, further cause the system to:

determine, using the second data, a first gain corresponding to the first frequency band;

determine, using the second data, a first difference in gain between the first frequency band and a second frequency band, wherein the second frequency band is adjacent to and has a lower frequency than the first frequency band;

determine, using the second data, a second difference in gain between the first frequency band and a third frequency band, wherein the third frequency band is adjacent to and has a higher frequency than the first frequency band;

determine, using the first difference and the second difference, a first Q-factor corresponding to the first frequency band;

determine, using the first gain and the first Q-factor, second coefficients for a first filter; and determine the first coefficients using at least the second coefficients and third coefficients for a second filter corresponding to the second frequency band, wherein the first set of filters include at least the first filter and the second filter.

15. The system of claim 14, wherein determining the first coefficients includes repeating the operations of determining the first gain and determining the second coefficients to reduce an error between the first transfer function and a transfer function of a set of filters corresponding to coefficients computed at each iteration of the operations.

16. The system of claim 11, wherein:

the PAD is a first PAD corresponding to a left ear;

a second PAD corresponds to a right ear, and the second PAD includes a second equalizer component corresponding to a second set of filters different from the first set of filters.

17. The system of claim 11, wherein the at least one memory further includes instructions that, when executed by the at least one processor, further cause the system to:

receive a first indication of a first volume setting corresponding to output of the first audio;

receive a second indication of a second volume setting, different from the first volume setting, corresponding to output of second audio;

reconfigure, using the second indication, the first equalizer component, the reconfigured first equalizer component corresponding to a third transfer function different from the second transfer function;

receive second audio data for output by the PAD;

generate, using the second audio data and the reconfigured first equalizer component, equalized second audio data; and output the second audio corresponding to the equalized second audio data.

18. The system of claim 11, wherein:

the PAD is a first PAD corresponding to a right ear, a second PAD corresponds to a left ear, the first equalizer component is implemented by at least a first processor of the first PAD, a second equalizer component is implemented by at least a second processor of the second PAD, and the at least one memory further includes instructions that, when executed by the at least one processor, further cause the system to:

generate, using second audio data and the second equalizer component, equalized second audio data; and output, from the second PAD, third audio corresponding to the equalized second audio data.

19. The system of claim 11, wherein the PAD is a first PAD corresponding to a right ear and a second PAD corresponds to a left ear, and the at least one memory further includes instructions that, when executed by the at least one processor, further cause the system to:

cause third audio data to be equalized by a second equalizer component prior to output by the second PAD, the first equalizer component corresponding to the first PAD;

process, using at least a first processor of the first PAD, the equalized second audio data to determine a first audio amplitude representing an output volume of the first PAD;

process, using the at least first processor, the equalized third audio data to determine a second audio amplitude representing an output volume of the second PAD;

determine that one or more of the first audio amplitude or the second audio amplitude exceeds a limit; and in response to determining that one or more of the first audio amplitude or the second audio amplitude exceeds the limit, reduce an output volume setting of the first PAD.

20. The system of claim 11, wherein the first set of filters includes a first biquadratic filter corresponding to the first frequency band and a second biquadratic filter corresponding to the second frequency band.

* * * * *